United States Patent
Cho et al.

(10) Patent No.: US 11,989,061 B2
(45) Date of Patent: May 21, 2024

(54) ELECTRONIC DEVICE INCLUDING FLEXIBLE DISPLAY

(71) Applicant: SAMSUNG ELECTRONICS CO., LTD., Suwon-si (KR)

(72) Inventors: Hyoungtak Cho, Suwon-si (KR); Youngmin Ji, Suwon-si (KR); Hyunggwang Kang, Suwon-si (KR); Myunghoon Kwak, Suwon-si (KR); Junhyuk Kim, Suwon-si (KR); Yeonggyu Yoon, Suwon-si (KR); Hojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/483,277

(22) Filed: Sep. 23, 2021

(65) Prior Publication Data
US 2022/0091636 A1     Mar. 24, 2022

Related U.S. Application Data

(63) Continuation of application No. PCT/KR2021/012974, filed on Sep. 23, 2021.

(30) Foreign Application Priority Data

Sep. 23, 2020  (KR) .......... 10-2020-0123314
Jul. 28, 2021   (KR) .......... 10-2021-0098895

(51) Int. Cl.
*G06F 1/16*     (2006.01)
(52) U.S. Cl.
CPC .......... *G06F 1/1652* (2013.01); *G06F 1/1626* (2013.01); *G06F 1/1656* (2013.01); *G06F 1/1681* (2013.01)

(58) Field of Classification Search
CPC ............................ G06F 1/1652; G06F 1/1624
See application file for complete search history.

(56) References Cited

U.S. PATENT DOCUMENTS 10,747,269 B1     8/2020   Choi et al.
2003/0230058 A1  12/2003  Nix
(Continued)

FOREIGN PATENT DOCUMENTS

CN      101519040        9/2009
EP      2 822 159 A2     1/2015
(Continued)

OTHER PUBLICATIONS

International Search Report and Written Opinion dated Jan. 3, 2022 in corresponding International Application No. PCT/KR2021/012974.
(Continued)

*Primary Examiner* — Kevin M Nguyen
(74) *Attorney, Agent, or Firm* — Nixon & Vanderhye P.C.

(57) ABSTRACT

An electronic device may include: a first housing capable of being slid; a second housing; a flexible display including a first region mounted on one surface of the first housing and a second region extending from the first region, wherein the second region is at least partially accommodated inside the first housing or the second housing or exposed to an outside of the first housing or the second housing based on a sliding movement of the first housing; a driving unit disposed in the second housing and configured to provide power for sliding the first housing; and a rail unit including a rail configured to receive the power from the driving unit and to move together with the first housing when the first housing slides.

20 Claims, 26 Drawing Sheets

(56) References Cited

U.S. PATENT DOCUMENTS

| | | | |
|---|---|---|---|
| 2007/0051847 A1 | 3/2007 | Quitmeyer | |
| 2012/0212433 A1 | 8/2012 | Lee et al. | |
| 2014/0218375 A1 | 8/2014 | Kim | |
| 2016/0374228 A1* | 12/2016 | Park | G09F 9/301 |
| 2017/0373269 A1 | 12/2017 | Seo et al. | |
| 2019/0305237 A1 | 10/2019 | Shin et al. | |
| 2020/0264660 A1 | 8/2020 | Song et al. | |
| 2020/0363841 A1 | 11/2020 | Kim et al. | |
| 2021/0045258 A1* | 2/2021 | Lee | H05K 5/0017 |

FOREIGN PATENT DOCUMENTS

| | | |
|---|---|---|
| EP | 2 954 388 | 12/2015 |
| EP | 3 702 880 A1 | 9/2020 |
| KR | 10-2003-0044233 | 6/2003 |
| KR | 2003-0095980 | 12/2003 |
| KR | 10-2012-0095019 | 8/2012 |
| KR | 10-2014-0100149 | 8/2014 |
| KR | 10-2018-0001636 | 1/2018 |
| KR | 10-2019-0062855 | 6/2019 |
| KR | 10-2019-0113128 | 10/2019 |
| WO | WO 2014/123272 A1 | 8/2014 |

OTHER PUBLICATIONS

Extended European Search Report dated Jan. 4, 2024 for EP Application No. 21872912.7.

\* cited by examiner

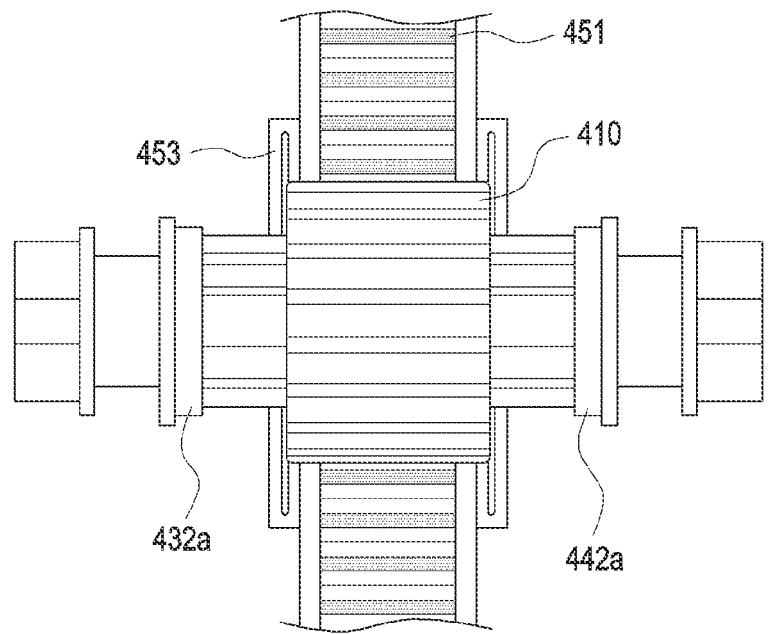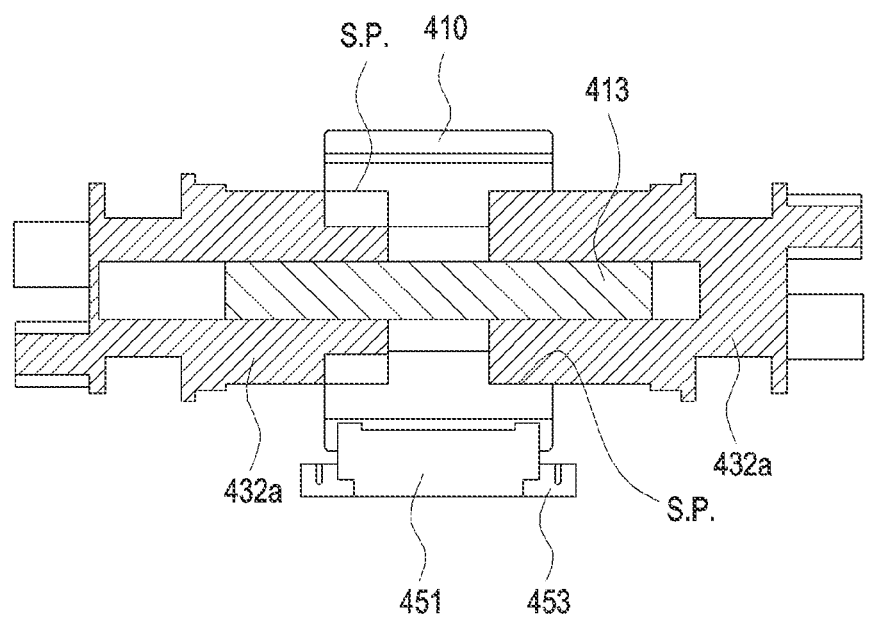
FIG.16

ELECTRONIC DEVICE INCLUDING FLEXIBLE DISPLAY

CROSS-REFERENCE TO RELATED APPLICATIONS

This application is a continuation of International Application No. PCT/KR2021/012974 designating the United States, filed on Sep. 23, 2021, in the Korean Intellectual Property Receiving Office and claiming priority to Korean Patent Application No. 10-2020-0123314, filed on Sep. 23, 2020, in the Korean Intellectual Property Office, and to Korean Patent Application No. 10-2021-0098895, filed on Jul. 28, 2021, in the Korean Intellectual Property Office, the disclosures of all of which are incorporated by reference herein in their entireties.

BACKGROUND

Field

The disclosure relates to a sliding-type rollable electronic device including a flexible display.

Description of Related Art

As the demand for mobile communication increases and the degree of integration of electronic devices increases, portability of electronic devices such as mobile communication terminals may be improved, and convenience in using multimedia functions may be improved. For example, by replacing a traditional mechanical (button-type) keypad with a display in which a touch screen function is integrated, an electronic device can be miniaturized while maintaining the function of the input device thereof. For example, when a mechanical keypad is removed from an electronic device, the portability of the electronic device can be improved. In an embodiment, when a display is expanded by the region in which the mechanical keypad is removed, an electronic device including a touch screen function can provide a larger screen compared to an electronic device including the mechanical keypad, even when the electronic device including the touch screen function has the same size and weight as the electronic device including the mechanical keypad.

In using a web surfing or multimedia function, it may be more convenient for a user to use an electronic device that outputs a large screen. A larger display may be mounted on an electronic device in order to output a large screen. However, considering the portability of the electronic device, there may be restrictions in increasing the size of the display. A display using an organic light-emitting diode or the like may make it possible to ensure portability of an electronic device while providing a larger screen. For example, a display using an organic light-emitting diode (or an electronic device equipped with the display) may make it possible to implement a stable operation even if it is made very thin so that the display can be mounted on an electronic device in a foldable, bendable, or rollable form. The rollable electronic device described herein may include a rolling-type rollable electronic device in which the display can be wound several times or more around a guide member (e.g., a roller) and a rollable electronic device of a sliding-type rollable electronic device in which the display is slidable. As described above, by mounting a display on an electronic device in a foldable, slidable, or rollable form, it is possible to provide an electronic device that outputs a larger screen to the user.

In an existing sliding-type electronic device, the operation of expanding or contracting a display may be performed in a manual method in which the user directly presses the display with his/her hand and applies a force to the display. However, when the display is expanded or contracted through a manual method as described above, a load may be applied to the flexible display to cause damage, or a structure supporting the flexible display and/or an internal component of the electronic device may be damaged. Accordingly, an automatic method using a motor may be considered instead of a manual method in which the user applies a force to expand or contract the display.

A sliding-type rollable electronic device may include an multi-articular hinge structure configured to support at least a portion of a flexible display inside a housing, and a guide member (e.g., a roller) configured to support the display and the multi-articular hinge structure and to guide a sliding movement of the same. In this case, a motor module for providing a large driving force may be required in consideration of a repulsive force of the flexible display and a frictional force between structures supporting the flexible display. Here, the motor module may generally include one motor and one reduction gear.

When the motor module is mounted inside the housing, the size and arrangement of the motors may be limited due to the limitation of the internal space of the electronic device and the mounting of components mounted inside the electronic device. For example, it may be considered to connect and arrange two motor modules in parallel inside the electronic device. In this case, due to the parallel arrangement of the motor modules, a printed circuit board mounting space or a battery mounting space in the internal space of the electronic device may become insufficient. In addition, for example, it may be considered to connect and arrange the two motor modules in series inside the electronic device or to arrange the two motor modules independently to be separated from each other.

SUMMARY

Embodiments of the disclosure provide an electronic device in which, a driving unit for expansion or contraction of a display, spatial mountability for a printed circuit board and a battery is not restricted even if the driving unit includes at least two motor modules.

According to various example embodiments of the disclosure, an electronic device is provided, the electronic device including a flexible display, wherein the electronic device comprises: a first housing configured to slide; a second housing; a flexible display including a first region mounted on one surface of the first housing and a second region extending from the first region, wherein the second region is at least partially accommodated inside the first housing or the second housing or exposed to an outside of the first housing or the second housing according to a sliding movement of the first housing; a driving unit comprising circuitry disposed in the second housing and configured to provide power for sliding the first housing; a rail unit including a rail configured to receive the power from the driving unit and to move together with the first housing based on the first housing sliding, wherein the driving unit includes a pinion engaged with the rail of the rail unit and a plurality of motor modules including at least one motor disposed on a same rotation shaft as the pinion.

According to various example embodiments of the disclosure, an electronic device including a flexible display is provided, wherein the electronic device includes: a first housing including a first front plate oriented in a first direction and a first rear plate oriented in a second direction opposite the first direction; a second housing including a second front plate oriented in the first direction and a second rear plate oriented in the second direction opposite the first direction, wherein the second housing is coupled to surround at least a portion of the first housing and configured to guide a sliding movement of the first housing; a flexible display including a first region mounted on one surface of the first housing and a second region extending from the first region, wherein the second region is at least partially accommodated inside the first housing or exposed to the outside of the first housing based on the sliding movement of the first housing; a guide disposed at one side edge of the housing, wherein the guide is configured to guide the flexible display to move in a clockwise or counterclockwise direction while maintaining a predetermined curvature; a driving unit including circuitry fixedly coupled to one side edge of the second housing and disposed at least partially parallel to the guide, wherein the driving unit is configured to provide power for sliding the first housing; and a rail unit including a rail configured to receive the power from the driving unit and to move together with the first housing when the first housing slides, wherein the driving unit includes a pinion engaged with the rail of the rail unit and a plurality of motor modules including at least one motor disposed on a same rotation shaft as the pinion.

According to various example embodiments of the disclosure, since the display can be expanded or contracted using a motor and a gear structure, it is possible to improve user convenience.

According to various example embodiments of the disclosure, when a motor module including a motor and a reduction gear is dually applied, it is possible to improve spatial mountability of a component inside a housing without increasing the size of the electronic device.

According to various example embodiments of the disclosure, it is possible to provide an electronic device conforming to a trend of reducing an electronic device in size and thickness.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 16 is a diagram illustrating a pinion and a gear shaft according to various embodiments;

DETAILED DESCRIPTION

Hereinafter, various example embodiments of the disclosure will be described with reference to the accompanying drawings.

Figure 1:
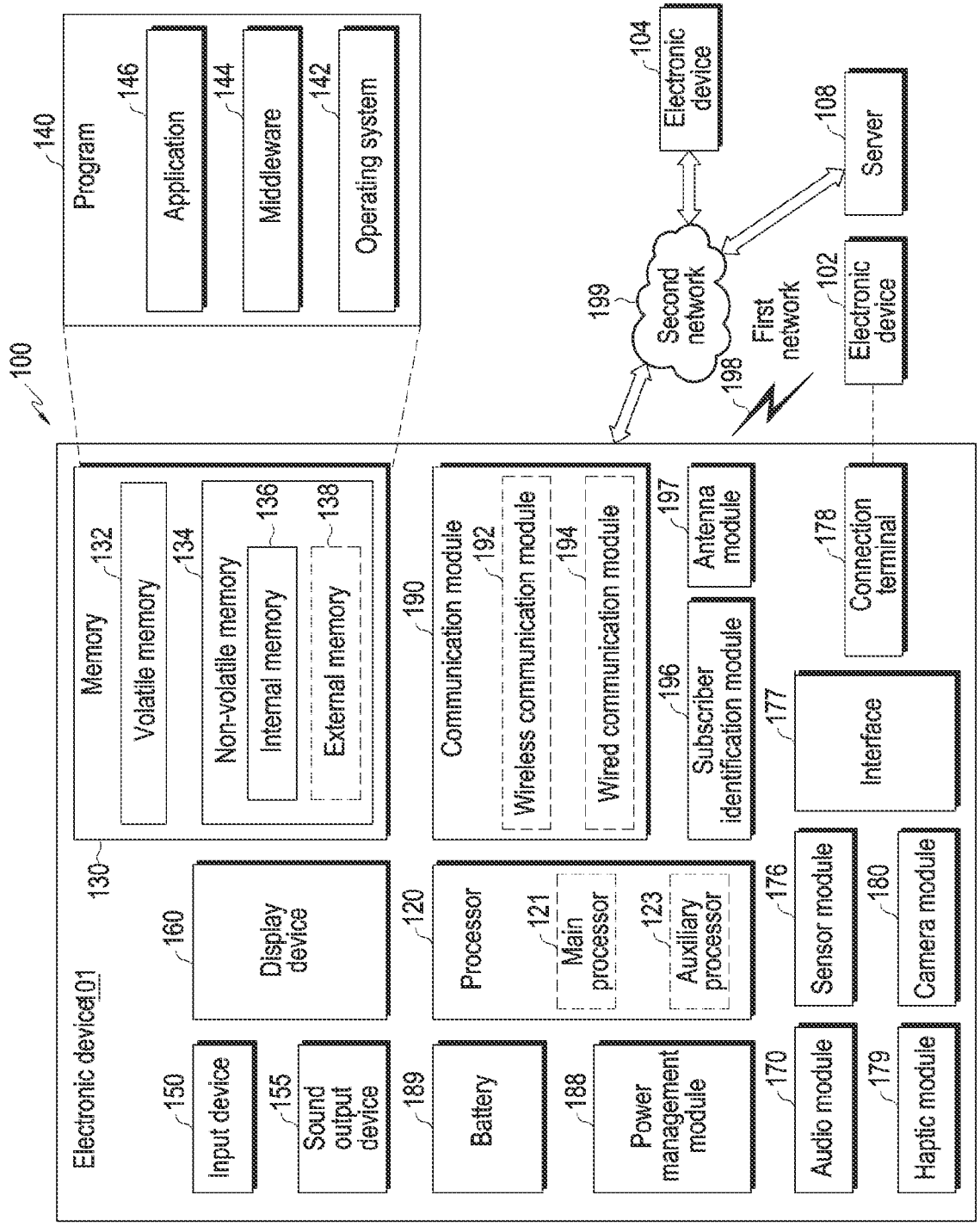
FIG. 1 is a block diagram of an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
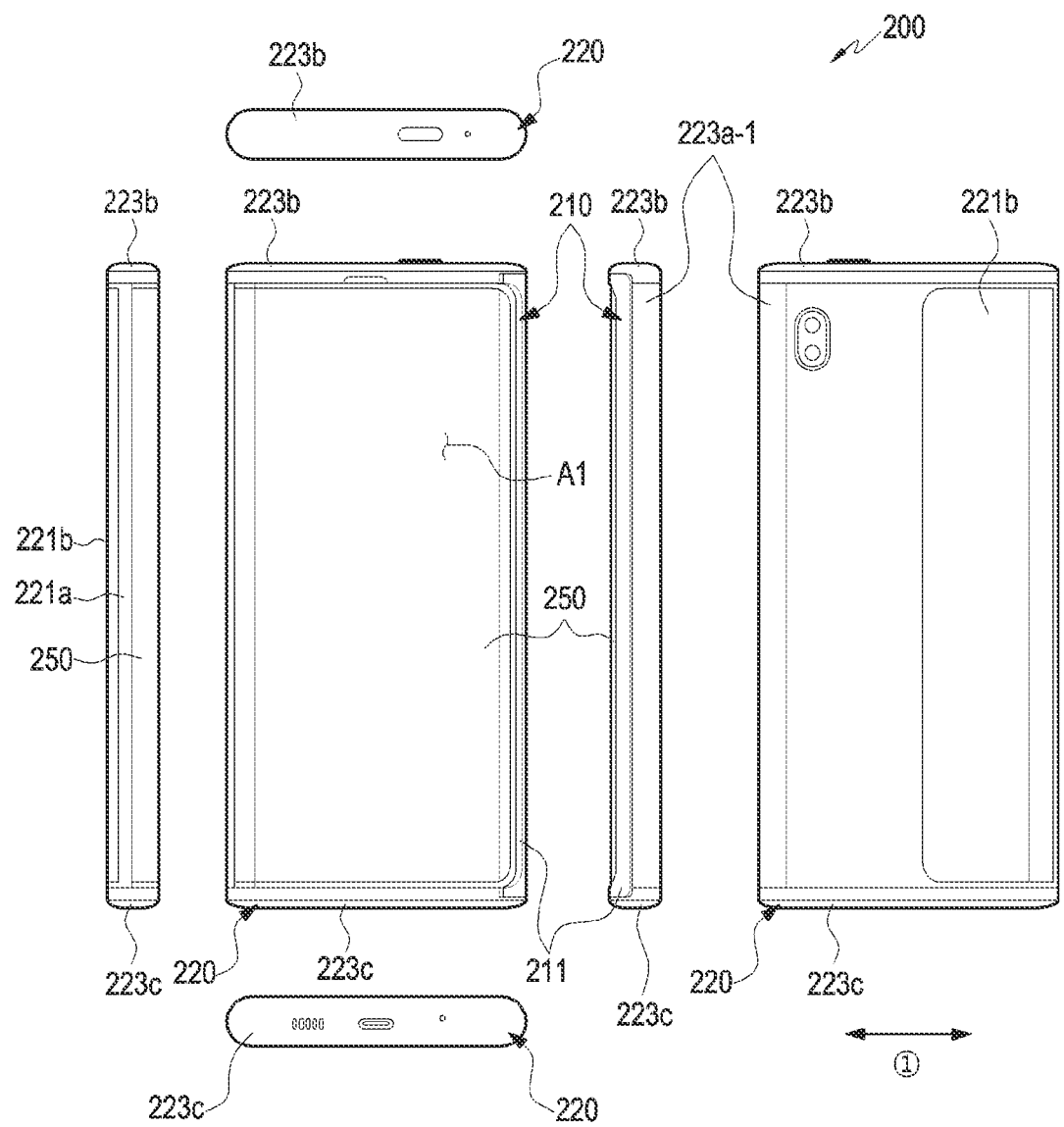
FIG. 2 is a diagram illustrating an example electronic device in the state in which a portion of a flexible display is accommodated in a second structure (e.g., second housing) according to various embodiments.
Figure 3:
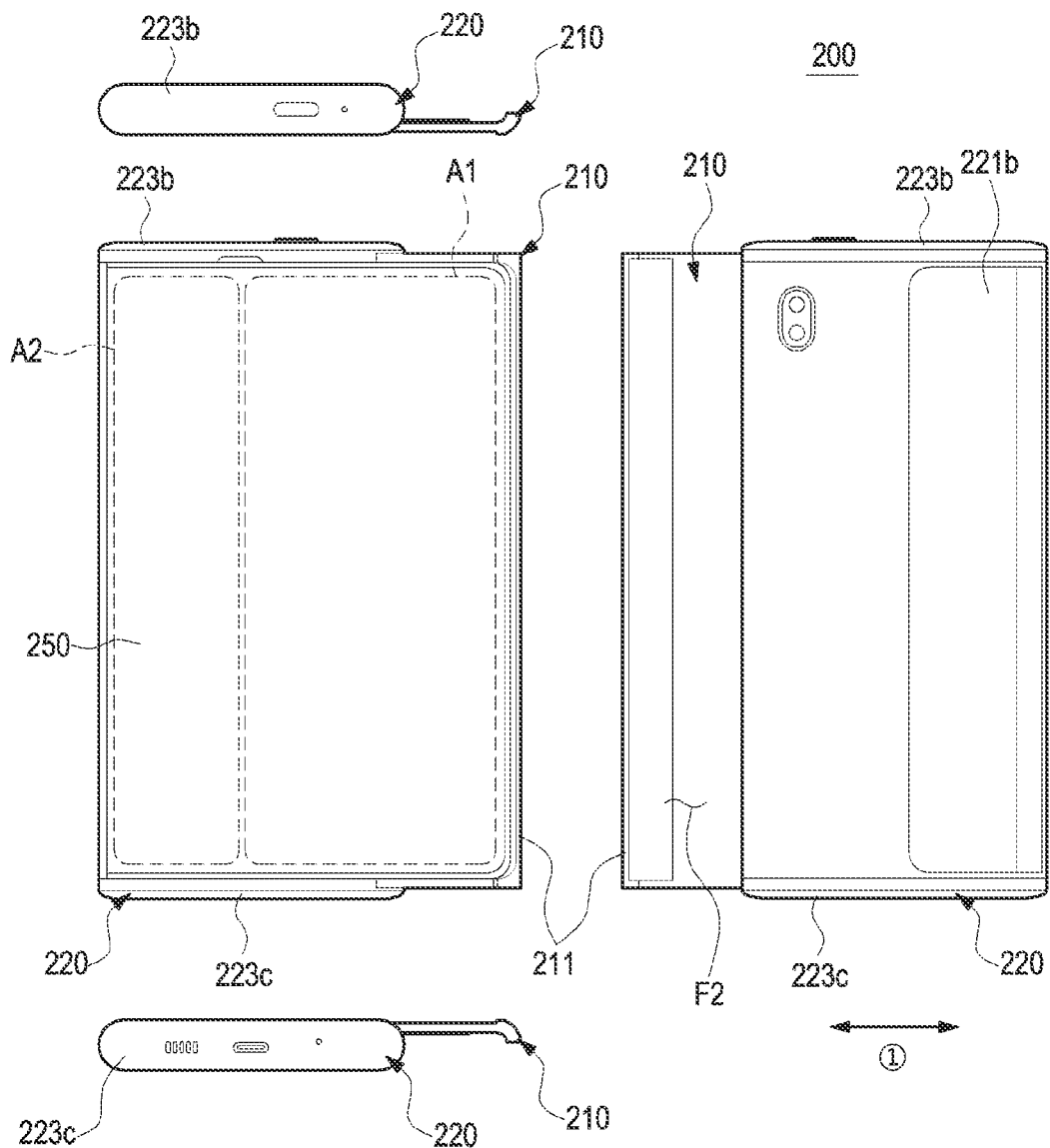
FIG. 3 is a diagram illustrating the electronic device in the state in which most of the flexible display is exposed to the outside of the second structure according to various embodiments.

FIG. 2 is a diagram illustrating an electronic device 200 in the state in which a portion of a flexible display 250 (e.g., an alpha region α (see FIG. 4)) is accommodated in a second structure 220 according to various embodiments. FIG. 3 is a diagram illustrating the electronic device in the state in which most of the flexible display 250 is exposed to the outside of the second structure 220 according to various embodiments.

The electronic device 200 of FIGS. 2 and 3 is an example of the electronic device 101 illustrated in FIG. 1, and may be a rollable electronic device. The rollable electronic device may include a rolling-type electronic device in which a display is rolled along a guide member such as a roller, and a sliding-type electronic device in which the display is slidable. In the embodiments to be described below, a sliding-type electronic device will be mainly described. It should be noted that the following description is also applicable to other types of rollable electronic devices (e.g., a rolling-type electronic device) without a separate description.

The state illustrated in FIG. 2 may be referred to, for example, as the state in which as the first structure 210 is closed relative to the second structure 220 (the terms first and second structure may be used interchangeably with the terms first and second support, first and second housing, first and second slidable housing, etc.), and the state illustrated in FIG. 3 may be referred to, for example, as the state in which the first structure 210 is open relative to the second structure 220. According to an embodiment, the "closed state" or the "open state" may refer, for example, to the state in which the electronic device is closed or the state in which the electronic device is open. According to an embodiment, the closed state of the electronic device 200 may refer, for example, to a state in which the width of the slidable housing 201 of the electronic device 200 is the minimum, and the open state of the electronic device 200 may be referred to as a state in which the width of the slidable housing 201 of the electronic device 200 is maximum. According to an embodiment, the closed state of the electronic device 200 may be referred to as a state in which the area of the portion of the display 250 exposed to the outside is minimized, and the open state of the electronic device 200 may be referred to as a state in which the region of the display 250 exposed to the outside is maximized.

Referring to FIGS. 2 and 3 together, the electronic device 200 may include a first structure 210 and a second structure 220 disposed to be movable on the first structure 210. In various embodiments, the electronic device 200 may be interpreted as a structure in which the first structure 210 is disposed to be slidable on the second structure 220. According to an embodiment, the first structure 210 may be disposed to be reciprocable by a predetermined distance in the illustrated direction (e.g., the direction indicated by arrow ①) relative to the second structure 220.

According to various embodiments, the first structure 210 may be referred to as, for example, a first housing structure, a slide unit, a slidable housing, a support or a slide housing, and may be disposed to be reciprocable on the second structure 220. In an embodiment, the second structure 220 may be referred to as, for example, a second housing structure, a main unit, a second housing, a second support or a main housing, and may accommodate various electrical and electronic components such as a printed circuit board (e.g., a main circuit board) and a battery. A portion of the display 250 (e.g., the first region A1) may be seated on the first structure 210. According to an embodiment, when the first structure 210 moves (e.g., slides) relative to the second structure 220, another portion of the display 250 (e.g., the second region A2) may be accommodated inside the second structure 220 (e.g., a slide-in operation) or exposed to the outside of the second structure 220 (e.g., a slide-out operation). Here, a portion of the display 250 (e.g., the first region A1) may be a basic use region when the display 250 is in the slid-in state, and another portion of the display 250 (e.g., the second region A2) may be an expanded region in the slid-out state.

In FIGS. 2 and 3, an embodiment in which the basic use region of the display 250 (e.g., the first region A1) in the slid-in state is seated on the first structure 210 is illustrated. In addition, according to the embodiment illustrated in FIG. 3, the basic use region (e.g., the first region A1) in the slid-out state of the display 250 is disposed on the right side in the direction in which the display 250 is expanded and the expanded region (e.g., the second region A2) is disposed on the left side of the display 250. However, the disclosure is not necessarily limited thereto. In comparison to that illustrated in FIG. 3, the basic use region (e.g., the first region A1) in the slid-out state of the display 250 may be disposed on the left side, which is opposite to the direction in which the display 250 is expanded, and the extended area (e.g., the second region A2) may be disposed on the right side of the display 250.

According to various embodiments, the first structure 210 may include a first plate 211 (e.g., a slide plate), and a first surface F1 (refer to FIG. 4) including at least a portion of the first plate 211 and a second surface F2 facing away from the first surface F1 may be included. According to an embodiment, the second structure 220 may include a second plate 221*a* (e.g., a rear case), a first side wall 223*a* extending from the second plate 221*a*, a second side wall 223*b* extending from the first side wall 223*a* and the second plate 221*a*, a third side wall 223*c* extending from the first side wall 223*a* and the second plate 221*a* and parallel to the second side wall 223*b*, and/or a rear plate 221*b* (e.g., a rear window). In various embodiments, the second side wall 223*b* and the third side wall 223*c* may be perpendicular to the first side wall 223*a*. According to an embodiment, the second plate 221*a*, the first side wall 223*a*, the second side wall 223*b*, and the third side wall 223*c* may be open on one side (e.g., the front surface) to accommodate (or surround) at least a portion of the first structure 210. For example, the first structure 210 is coupled to the second structure 220 in a state of being at least partially surrounded and is slidable in a direction parallel to the first surface F1 (e.g., the front surface) or the second surface F2 (e.g., the rear surface), for example, in the direction indicated by arrow ①), while being guided by the second structure 220.

According to various embodiments, the second side wall 223*b* or the third side wall 223*c* may be omitted. According to an embodiment, the second plate 221*a*, the first side wall 223*a*, the second side wall 223*b*, and/or the third side wall 223*c* may be configured as separate structures and coupled or assembled to each other. The rear plate 221*b* may be coupled to surround at least a portion of the second plate 221*a*. In an embodiment, the rear plate 221*b* may be substantially integrated with the second plate 221*a*. According to an embodiment, the second plate 221*a* or the rear plate 221*b* may cover at least a portion of the flexible display 250. For example, the flexible display 250 may be at least partially accommodated inside the second structure 220, and the second plate 221*a* or the rear plate 221*b* may cover a portion of the flexible display 250 accommodated inside the second structure 220.

According to various embodiments, the first structure 210 is movable to the open state or the closed state relative to the second structure 220 in a first direction (e.g., direction ①) so that the first structure 210 is located at a first distance from the first side wall 223*a* in the closed state and at a second distance, which is greater than the first distance, from the first side wall 223*a* in the open state. In various embodiments, in the closed state, the first structure 210 may be positioned to surround a portion of the first side wall 223*a*.

According to various embodiments, the first sidewall 223*a* may move integrally with the first structure 210. The second structure 220 may include a fourth sidewall (not illustrated) located opposite to the first sidewall 223*a*, and may be applied in a form in which, in the state in which the fourth side wall (not illustrated) is fixed, the first side wall 223*a* moves away from the fourth sidewall (not illustrated) along with the movement of the first structure 210. In addition, the expansion of the slidable housing according to the sliding movement of the first structure 210 may vary depending on embodiments.

According to various embodiments, the electronic device 200 may include a display 250, a key input device, a connector hole, an audio module, or a camera module. Although not illustrated, the electronic device 200 may further include an indicator (e.g., an LED device) or various sensor modules. Here, the display 250 may be coupled to or disposed adjacent to a touch detection circuit, a pressure sensor capable of measuring a touch intensity (pressure), and/or a digitizer configured to detect a magnetic-field-type stylus pen.

According to various embodiments, the display 250 may include a first region A1 and a second region A2. In an embodiment, the first region A1 may extend substantially across at least a portion of the first plate 211 to be disposed on the first surface F1. The second region A2 extends from the first region A1 and may be inserted or accommodated into the second structure 220 (e.g., the main housing) according to the sliding movement of the first structure 210, or may be exposed to the outside of the second structure 220. As will be described later, the second region A2 is moved while substantially being guided by a guide member 235 (e.g., a roller) mounted on the second structure 220 to be accommodated in the inside of the second structure 220 or exposed to the outside of the second structure 220. For example, while the first structure 210 slides, a portion of the second region A2 may be deformed into a curved shape at a position corresponding to the guide member. According to various embodiments, when viewed from above the first plate 211 (e.g., the slide plate), if the first structure 210 moves from the closed state to the open state, the second region A2 may define a substantially flat surface with the first region A1 while being gradually exposed to the outside of the second structure 220. In various embodiments, the second region A2 may be at least partially accommodated inside the second structure 220, and a portion of the second region A2 may also be exposed to the outside even in the state illustrated in FIG. 2 (e.g., the closed state). In various embodiments, irrespective of the closed state or the open state, a portion of the exposed second region A2 may be located on the guide member (not illustrated), and at a position corresponding to the guide member (not illustrated), a portion of the second region A2 may maintain a curved shape. In the embodiment illustrated in FIGS. 2 and 3, an embodiment in which the guide member is disposed opposite to the direction in which the display of the electronic device 200 is expanded is illustrated, but the disclosure is not necessarily limited thereto. An embodiment in which the guide member is disposed in the direction in which the display of the electronic device 200 is expanded may also be applied.

Figure 4:
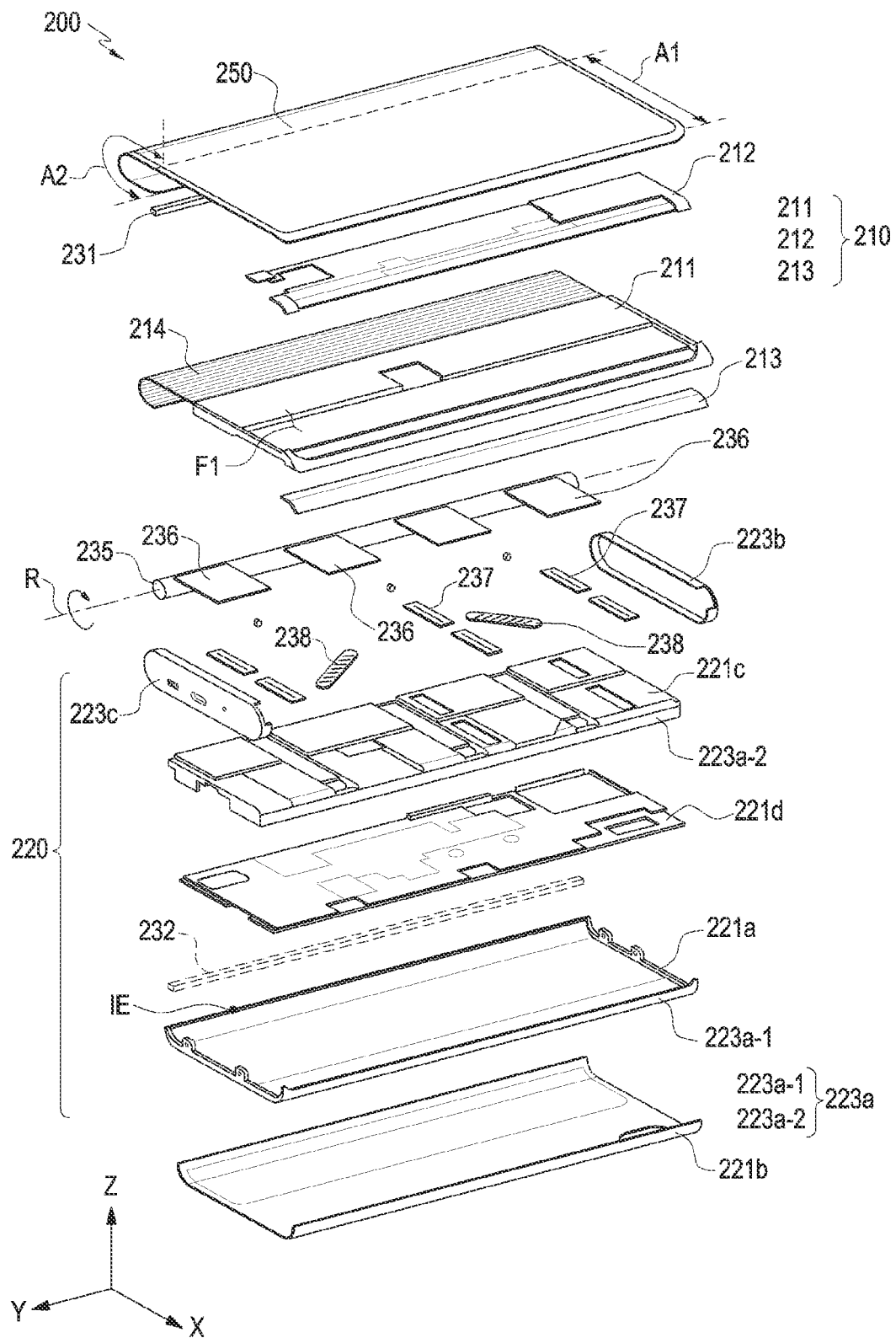
FIG. 4 is an exploded perspective view illustrating an electronic device according to various embodiments.

FIG. 4 is an exploded perspective view illustrating an electronic device 200 according to various embodiments.

In FIG. 4 and subsequent drawings, a spatial coordinate system defined by the X-axis, the Y-axis, and the Z-axis orthogonal to each other is illustrated. Here, the X axis may represent a width direction of the electronic device, the Y axis may represent a longitudinal direction of the electronic device, and the Z axis may represent a height (or thickness) direction of the electronic device. In the following description, the "first direction" may refer, for example, to a direction parallel to the Z axis.

Referring to FIG. 4, the electronic device 200 may include a first structure (e.g., first housing) 210, a second structure 220 (e.g., a main housing), a display 250 (e.g., a flexible display), a guide member (e.g., a roller 235), a support sheet 236, and/or an multi-articular hinge structure 214. A portion of the display 250 (e.g., the alphas region α, which will be described with reference to FIG. 5 below) may be accommodated inside the second structure 220 while being guided by the roller 235.

According to various embodiments, the first structure 210 may include a first plate 211 (e.g., a slide plate or a first front plate), and a first bracket 212 and/or a second bracket 213, which are mounted on the first plate 211. The first structure 210, for example, the first plate 211, the first bracket 212, and/or the second bracket 213, may be made of a metal material and/or a non-metal material (e.g., a polymer). The first plate 211 may be mounted on the second structure 220 (e.g., the main housing) to be linearly reciprocable in one direction (e.g., the direction indicated by arrow ① in FIG. 2 or FIG. 3) while being guided by the second structure 220. In an embodiment, the first bracket 212 may be coupled to the first plate 211 to define the first surface F1 of the first structure 210 together with the first plate 211. The first region A1 of the display 250 may be substantially mounted on the first surface F1 to maintain a flat plate shape. The second bracket 213 may be coupled to the first plate 211 to define the second surface F2 of the first structure 210 together with the first plate 211. According to an embodiment, the first bracket 212 and/or the second bracket 213 may be integrated with the first plate 211. This may be appropriately designed in consideration of the assembly structure or manufacturing process of a manufactured product. The first structure 210 or the first plate 211 may be coupled to the second structure 220 to be slidable relative to the second structure 220.

According to various embodiments, the multi-articular hinge structure 214 may include a plurality of bars (multiple bars) or rods and may be connected to one end of the first structure 210. For example, as the first structure 210 slides, the multi-articular hinge structure 214 may move relative to the second structure 220, and in the closed state (e.g., the state illustrated in FIG. 2), the first structure 210 may be substantially accommodated inside the second structure 220. In various embodiments, even in the closed state, a portion of the multi-articular hinge structure 214 may not be accommodated inside the second structure 220. For example, even in the closed state, a portion of the multi-articular hinge structure 214 may be positioned to correspond to the roller 235 outside the second structure 220. The plurality of rods may linearly extend to be disposed parallel to the rotation axis R of the roller 235, and may be arranged in a direction perpendicular to the rotation axis R, for example, the direction in which the first structure 210 slides.

Accordingly, as the first structure 210 slides, the plurality of rods may be arranged to define a curved surface or a flat surface shape. For example, as the first structure 210 slides, the multi-articular hinge structure 214 may define a curved surface in a portion facing the roller 235, and the multi-articular hinge structure 214 may define a flat surface in a portion not facing the roller 235. In an embodiment, a portion of the display 250 (e.g., the alpha region α to be described later with reference to FIG. 5) may be mounted or supported on the multi-articular hinge structure 214, and in the open state (e.g., the state illustrated in FIG. 3), the portion of the display 250 may be exposed to the outside of the second structure 220 together with the first region A1. In the state in which the second region A2 (e.g., the second region A2 in FIG. 3) is exposed to the outside of the second structure 220, the multi-articular hinge structure 214 may support or maintain the second region A2 (e.g., the second region A2 in FIG. 3) in the flat state by defining a substantially flat surface.

According to various embodiments, the second structure 220 (e.g., the main housing) may include a second plate 221a (e.g., the rear case or the second rear plate), a printed circuit board (not illustrated), a rear plate 221b, a third plate (221c) (e.g., the front case or the second front plate), and/or a support member 221d. The second plate 221a (e.g., the rear case) may be disposed to face away from the first surface F1 of the first plate 211 and may substantially provide the external shape of the second structure 220 or the electronic device 200. In an embodiment, the second structure 220 may include a first side wall 223a extending from the second plate 221a, a second side wall 223b extending from the second plate 221a to be substantially perpendicular to the first side wall 223a, and a third side wall 223c extending from the second plate 221a to be substantially perpendicular to the first side wall 223a and parallel to the second side wall 223b. In the illustrated embodiment, a structure in which the second side wall 223b and the third side wall 223c are manufactured as components separate from the second plate 221a and mounted on or assembled to the second plate 221a is exemplified. However, the second side wall 223b and the third side wall 223c may be manufactured integrally with the second plate 221a. The second structure 220 may accommodate an antenna for proximity wireless communication, an antenna for wireless charging, or an antenna for magnetic secure transmission (MST) in a space that does not overlap the multi-articular hinge structure 214.

According to various embodiments, the rear plate 221b may be coupled to the outer surface of the second plate 221a, and the rear plate 221b may be manufactured integrally with the second plate 221a depending on an embodiment. In an embodiment, the second plate 221a may be made of a metal or polymer material, and the rear plate 221b may be made of a material such as metal, glass, a synthetic resin, or ceramic to provide a decoration effect in the exterior of the electronic device 200. According to an embodiment, the second plate 221a and/or the rear plate 221b may be made of a material that transmits light through at least a portion (e.g., an auxiliary display region). For example, in the state in which a portion of the display 250 (e.g., the second region A2) is accommodated in the second structure 220, the electronic device 200 may output visual information using a partial region of the display 250 accommodated inside the second structure 220. The auxiliary display region may provide the visual information output from the region accommodated inside the second structure 220 to the outside of the second structure 220.

According to various embodiments, the third plate 221c may be made of a metal or polymer material and may be coupled to the second plate 221a (e.g., the rear case), the first side wall 223a, the second side wall 223b, and/or the third side wall 223c to define an internal space of the second structure 220. According to an embodiment, the third plate 221c may be referred to as a "front case", and the first structure 210 (e.g., the first plate 211) may slide in the state of substantially facing the third plate 221c. In various embodiments, the first side wall 223a may be configured by a combination with a first side wall portion 223a-1 extending from the second plate 221a and a second side wall portion 223a-2 disposed at a side edge of the third plate 221c. In an embodiment, the first side wall portion 223a-1 may be coupled to surround one side edge of the third plate 221c (e.g., the second side wall portion 223a-2), and in this case, the first side wall portion 223a-1 itself may be the first side wall 223a.

According to various embodiments, the support member 221d may be disposed in a space between the second plate 221a and the third plate 221c and may have a flat plate shape made of a metal or polymer material. The support member 221d may provide an electromagnetic shielding structure in the internal space of the second structure 220 or may improve mechanical rigidity of the second structure 220. In an embodiment, when received inside the second structure 220, the multi-articular hinge structure 214 and/or a partial region (e.g., the second region A2) of the display 250 may be located in a space between the second plate 221a and the support member 221d.

According to various embodiments, although not illustrated in the drawings, the first structure 210 may further include a fourth plate (e.g., the fourth plate 316 of FIG. 5) (or the first rear plate) facing away from the first plate 211 (or the first front plate). The fourth plate will be described in detail with reference to FIG. 5 and subsequent drawings.

According to various embodiments, a printed circuit board (not illustrated) may be disposed in a space between the third plate 221c and the support member 221d. For example, the printed circuit board may be accommodated in a space separated, by the support member 221d, from a space in which the multi-articular hinge structure 214 and/or a partial region of the display 250 is accommodated inside the second structure 220. A processor (e.g., the processor 120 in FIG. 1), a memory (e.g., the memory 130 in FIG. 1), and/or an interface (e.g., the interface 177 in FIG. 1) may be mounted on the printed circuit board. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 200 to an external electronic device, and may include a USB connector, an SD card/an MMC connector, or an audio connector.

According to various embodiments, the display 250 is a flexible display based on an organic light-emitting diode and is at least partially deformable into a curved shape while being generally maintained in a flat shape. In an embodiment, the first region A1 of the display 250 may be mounted or attached to the first surface F1 of the first structure 210 to maintain a substantially flat plate shape. The second region A2 extends from the first region A1 and may be supported on or attached to the multi-articular hinge structure 214. For example, the second region A2 may extend along the sliding movement direction of the first structure 210, may be accommodated inside the second structure 220 together with the multi-articular hinge structure 214, and may be deformed in an at least partially curved shape according to the deformation of the multi-articular hinge structure 214.

According to various embodiments, as the first structure 210 slides on the second structure 220, the area of the display 250 exposed to the outside may vary. The electronic device 200 (e.g., a processor) may change the region of the display 250 that is activated based on the area of the display 250 exposed to the outside. For example, in the open state or at a position intermediate between the closed state and the open state, the electronic device 200 may activate the region exposed to the outside of the second structure 220 in the total area of the display 250. In the closed state, the electronic device 200 may activate the first region A1 of the display 250 and deactivate the second region A2 of the display 250. In the closed state, when there is no user input for a predetermined period of time (e.g., 30 seconds or 2 minutes), the electronic device 200 may deactivate the entire area of the display 250. In various embodiments, in the state in which the entire area of the display 250 is deactivated, the electronic device 200 may provide visual information through an auxiliary display region (e.g., a portion of the second plate 221a and/or the rear plate 221b made of a material that transmits light) by activating a partial region of the display 250 as needed (e.g., providing a notification or a missed call/message arrival notification according to a user setting).

According to various embodiments, in the open state (e.g., the state illustrated in FIG. 2), substantially the entire region (e.g., the first region A1 and the second region A2) of the display 250 may be exposed to the outside, and the first region A1 and the second region A2 may be disposed to define a plane. In an embodiment, even in the open state, a portion (e.g., one end) of the second region A2 may be located to correspond to the roller 235, and the portion corresponding to the roller 235 in the second region A2 may be maintained in a curved shape. For example, in various embodiments disclosed herein, even if it is stated that "in the open state, the second region A2 is disposed to define a plane", a portion of the second region A2 may be maintained in a curved shape. Similarly, although it is stated that "in the closed state, the multi-articular hinge structure 214 and/or the second region A2 are accommodated in the second structure 220", a portion of the multi-articular hinge structure 214 and/or the second region A2 may be located outside the second structure 220.

According to various embodiments, a guide member (e.g., the roller 235) may be rotatably mounted on the second structure 220 at a position adjacent to one side edge of the second structure 220 (e.g., the second plate 221a). For example, the roller 235 may be disposed adjacent to the edge of the second plate 221a parallel to the first side wall 223a (e.g., the portion indicated by reference numeral "IE"). Although reference numerals are not given in the drawings, another side wall may extend from an edge of the second plate 221a adjacent to the roller 235, and the side wall adjacent to the roller 235 may be substantially parallel to the first side wall 223a. As mentioned above, the side wall of the second structure 220 adjacent to the roller 235 may be made of a material that transmits light, and a portion of the second region A2 may provide visual information through a portion of the second structure 220 in the state of being accommodated in the second structure 220.

According to various embodiments, one end of the roller 235 may be rotatably coupled to the second side wall 223b, and the other end may be rotatably coupled to the third side wall 223c. For example, the roller 235 may be mounted on the second structure 220 to rotate about the rotation axis R (or the rotation axis R parallel to the longitudinal direction of the electronic device 200) perpendicular to the sliding direction of the first structure 210 (e.g., the direction indicated by arrow ① in FIG. 2 or FIG. 3). The rotation axis R may be disposed substantially parallel to the first side wall 223a, and may be located, for example, at one edge of the second plate 221a far from the first side wall 223a. In an embodiment, the gap provided between the outer circumferential surface of the roller 235 and the inner surface of the edge of the second plate 221a may define an inlet through which the multi-articular hinge structure 214 or the display 250 enters the inside of the second structure 220.

According to various embodiments, when the display 250 is deformed into a curved shape, the roller 235 is able to suppress excessive deformation of the display 250 by maintaining the radius of curvature of the display 250 to a certain degree. "Excessive deformation" may refer, for example, to the display 250 being deformed to have an excessively small radius of curvature to the extent that pixels or signal wires included in the display 250 are damaged. For example, the display 250 may be moved or deformed while being guided by the roller 235 and may be protected from damage due to excessive deformation. In various embodiments, the roller 235 may rotate while the multi-articular hinge structure 214 or the display 250 is inserted into or extracted from the second structure 220. For example, by suppressing friction between the multi-articular hinge structure 214 (or the display 250) and the second structure 220, the multi-articular hinge structure 214 (or the display 250) is able to smoothly perform the insertion/extraction operation of the second structure 220.

According to various embodiments, the support sheet 236 may be made of a flexible and somewhat elastic material, for example, a material including an elastic body such as silicone or rubber. The support sheet 236 may be mounted on or attached to the roller 235 and may be selectively wound around the roller 235 as the roller 235 rotates. In the illustrated embodiment, a plurality of (e.g., four) support sheets 236 may be arranged along the direction of the rotation axis R of the roller 235. For example, the plurality of support sheets 236 may be mounted on the roller 235 such that adjacent support sheets 236 are spaced apart from each other by a predetermined interval, and may extend in a direction perpendicular to the rotation axis R. In an embodiment, one support sheet may be mounted on or attached to roller 235. For example, one support sheet may have a size and shape corresponding to the region in which the support sheets 236 are disposed and the regions between the support sheets 236 in FIG. 4. In this way, the number, size, or shape of the support sheets 236 may be appropriately changed depending on an actually manufactured product. In various embodiments, the support sheet 236 may be rolled on the outer circumferential surface of the roller 235 as the roller 235 rotates or may be spread out from the roller 235 in a flat plate shape from the gap between the display 250 and the third plate 221c. In an embodiment, the support sheet 236 may be referred to as a "support belt", an "auxiliary belt", a "support film", or an "auxiliary film".

According to various embodiments, the electronic device 200 may include at least one elastic member 231 or 232 made of a low-density elastic body, such as a sponge, or a brush. For example, the electronic device 200 may include a first elastic member 231 mounted on one end of the display 250, and may further include a second elastic member 232 mounted on the inner surface of an edge of the second plate 221a depending on an embodiment. The first elastic member 231 may be substantially disposed in the internal space of the second structure 220, and in the open state (e.g., the state illustrated in FIG. 3), the first elastic member 231 may be located to correspond to the edge of the second plate 221a. In an embodiment, the first elastic member 231 may move in the internal space of the second structure 220 according to the sliding movement of the first structure 210. When the first structure 210 moves from the closed state to the open state, the first elastic member 231 may move toward the edge of the second plate 221a. When the first structure 210 reaches the open state, the first elastic member 231 may come into contact with the inner surface of the edge of the second plate 221a. For example, in the open state, the first elastic member 231 may seal the gap between the inner surface of the edge of the second plate 221a and the surface of the display 250. In an embodiment, when moving from the closed state to the open state, the first elastic member 231 may move while being in contact with the second plate 221a (e.g., slide contact). For example, when foreign matter is introduced into the gap between the second region A2 and the second plate 221a in the closed state, the first elastic member 231 may discharge the foreign matter to the outside of the second structure 220 while moving to the open state.

According to various embodiments, the second elastic member 232 may be attached to the inner surface at the edge of the second plate 221a and may be disposed to substantially face the inner surface of the display 250. In the closed state, the gap (e.g., the arrangement gap) between the surface of the display 250 and the inner surface of the edge of the second plate 221a may be substantially determined by the second elastic member 232. According to an embodiment, in the closed state, the second elastic member 232 may substantially seal the arrangement gap by coming into contact with the surface of the display 250. According to an embodiment, the second elastic member 232 may be made of a low-density elastic body, such as a sponge, or a brush, so that the surface of the display 250 may not be damaged even if it comes into direct contact with the display 250. In an embodiment, the arrangement gap may increase as the first structure 210 gradually moves to the open state. For example, the second region A2 of the display 250 may be gradually exposed to the outside of the second structure 220 without substantially coming into contact with or rubbing against the second elastic member 232. When the first structure 210 reaches the open state, the first elastic member 231 may come into contact with the second elastic member 232. For example, in the open state, the first elastic member 231 and the second elastic member 232 may block the inflow of foreign matter by sealing the arrangement gap.

According to various embodiments, the electronic device 200 may further include a guide rail(s) 237 and/or an actuating member(s) 238. The guide rail(s) 237 may be mounted on the second structure 220 (e.g., the third plate 221c) to guide the sliding movement of the first structure 210 (e.g., the first plate 211 or slide plate). The actuating member(s) 238 may include a spring or a spring module that provides an elastic force in a direction to move opposite ends thereof away from each other. One end(s) of the actuating member(s) 238 may be rotatably supported by the second structure 220, and the other end(s) may be rotatably supported by the first structure 210. When the first structure 210 slides, the opposite ends of the actuating member(s) 238 may be located closest to each other at any one point between the closed state and the open state (hereinafter, referred to as a "closest point"). For example, in the section between the closest point and the closed state, the actuating member(s) 238 may provide an elastic force to the first structure 210 in a direction to move toward the closed state and in the section between the closest point and the open state, the actuating member(s) 238 may provide an elastic force to the first structure 210 in a direction to move toward the open state.

In the following detailed description, the components, which can be easily understood through the preceding embodiments, may be denoted by the same reference numerals as the preceding embodiments or the reference numerals may be omitted, and the detailed description thereof may also be omitted. An electronic device (e.g., the electronic device 200 of FIGS. 2, 3 and 4) according to various embodiments disclosed herein may be implemented by selectively combining configurations of different embodiments, and the configuration of an embodiment may be replaced by that of an embodiment. For example, it is noted that the disclosure is not limited to specific drawings or embodiments.

FIGS. 5A, 5B and 5C are diagrams illustrating example behaviors of a display 350 in a slide-in operation and a slide-out operation of a first structure 310 according to various embodiments.

According to various embodiments of the disclosure, the electronic device 300 (e.g., the electronic device 101 in FIG. 1 or the electronic device 200 of FIGS. 2 to 4) may include a housing 301 that includes a first surface, a second surface facing away from the first surface, a first side surface 310a surrounding at least a portion of the space between the first surface and the second surface, and a second side surface 320a facing away from the first side surface. At least a portion of the housing 301 may slide so that the distance between the first side surface 310a and the second side surface 320a is variable. Here, the first surface and the second surface may be defined by the first structure 310. For example, the first surface may be defined by the first plate 311 (or the first front plate) of the first structure 310, and the second surface may be defined by the fourth plate 316 (or the first rear plate) of the first structure 310. According to an embodiment, the first surface and/or the second surface may be defined here by the first structure 310, or may be additionally or alternatively defined by the second structure 320. According to an embodiment, the first side surface 310a may be defined by one side surface of the first structure 310, and the second side surface 320a may be defined by one side surface of the second structure 320.

Figure 5:
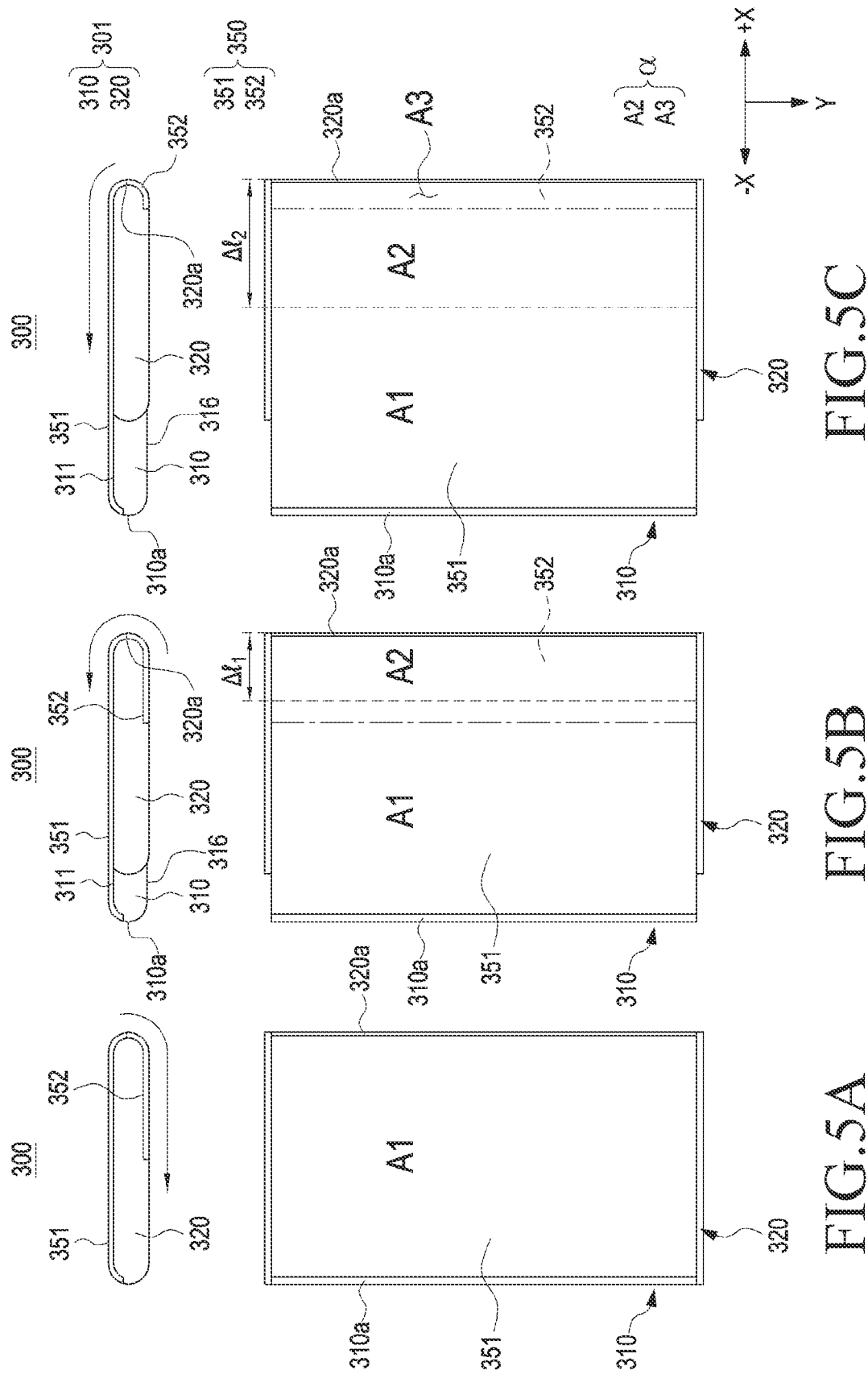
FIGS. 5A, 5B and 5C are diagrams illustrating behaviors of a display in a slide-in operation and a slide-out operation of a first structure (e.g., first housing) according to various embodiments.

Hereinafter, a plurality of portions (or a plurality of regions) of the display 350 according to various embodiments of the disclosure will be described with reference to FIG. 5.

According to an embodiment, the display 350 (e.g., the display 250 in FIGS. 2 to 4) may include a first portion 351 and a second portion 352. Here, the first portion 351 and the second portion 352 are separated for convenience of description and are not functionally or physically separated from each other. According to an embodiment, the display 350 may include a first region A1 and a second region A2. Here, it should be noted that the first region A1 and the second region A2 are also separated for convenience of description and are not necessarily functionally or physically separated from each other. According to various embodiments of the disclosure, portions referred to by the terms of "first portion" and "second portion" or "first region" and "second region" for the display are substantially the same as or similar to each other in configuration.

The display 350 may include a first portion 351 that is a region visible from the outside through at least one surface of the housing 301. In addition, the display 350 may include a second portion 352 that is at least partially surrounded by the housing 301 to be invisible from the outside. When the first portion 351 is expanded based on the slide-out operation of the first structure 310, the second part 352 may be contracted. When the first portion 351 is contracted based on the slide-in operation of the first structure 310, the second portion 352 is expanded.

The display 350 may include a first region A1, which is the basic use region in the state in which the first structure 310 is accommodated in the second structure 320, and a second region A2, which is a region expanded based on the sliding movement of the first structure 310.

The first region A1 may be a region that is visually recognized from the outside in the state in which the first structure 310 is accommodated in the second structure 320 and the display is not expanded. The second region A2 may be a region that is not visually recognized by being at least partially surrounded by the housing in the state in which the first structure 310 is accommodated in the second structure 320, but is visually recognized from the outside through at least one surface of the housing when the first structure 310 is extracted from the second structure 320 by the slide-out operation. In the slide-out operation of the first structure 310, the first region A1 and the second region A2 may configure a first portion 351 that is a region visible from the outside through at least one surface of the housing.

According to various embodiments, in the case in which the maximum expansible length of the display 350 is "$\Delta l_2$", the display 350 moves by "$\Delta l_1$" that is smaller than the maximum expansible length "$\Delta l_2$", it is possible to reduce the current consumption of the electronic device 300 by turning on the display 350 (ON) only as much as the externally recognized region in the second region A2 and turning off the remaining portion invisible from the outside off (OFF) or adjusting touch input sensitivity in the remaining portion.

According to various embodiments, the display 350 may include a third region A3. The third region A3 may be a portion that is not visually recognized from the outside when the first structure 310 is accommodated in the second structure 320 or even when the first structure 310 is extracted from the second structure 320 by a slide-out operation. For example, in FIGS. 5B and 5C, the dotted lines may indicate a boundary between the first region A1 and the second region A2. In FIGS. 5B and 5C, the alternated long and short dash lines may indicate the boundary of the third region A3. As illustrated in FIGS. 5B and 5C, when the display 350 of the electronic device 300 is viewed from above, the first region A1 and the second region A2 may be exposed to the outside. However, the third region A3 is in the state of being located on the rear surface of the second region A2 and may not be visually recognized from the outside. In the display 350, the third region A3 may be a portion provided to have a predetermined curvature together with the second region A2. According to an embodiment, the second region A2 and the third region A3 may surround at least a portion of a guide member (e.g., the guide member 235 in FIG. 4). The second region A2 and the third region A3 may have a curved shape at a position corresponding to the guide member. At least one portion of the second region A2 and the third region A3 may be supported by an multi-articular hinge structure (e.g., the multi-articular hinge structure 214 in FIG. 4).

According to various embodiments of the disclosure, the second region A2 and the third region A3 may be referred to as an "alpha region α". According to an embodiment, the alpha region α may move in a clockwise or counterclockwise direction around the guide member in the state of being supported by the multi-articular hinge structure (e.g., the multi-articular hinge structure 214 in FIG. 4).

Figure 6:
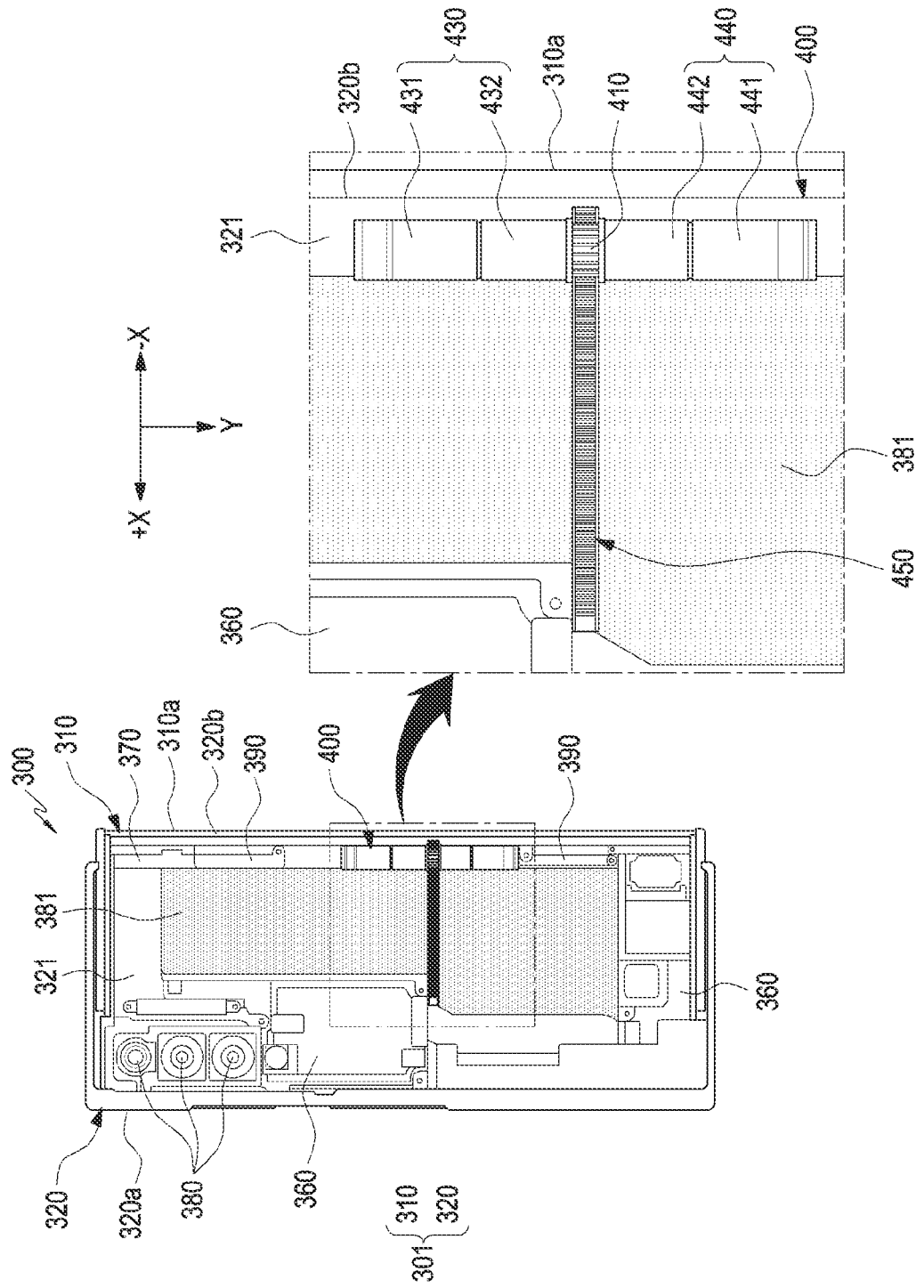
FIG. 6 is a diagram illustrating an electronic device in the state in which the first structure is slid in according to various embodiments.
Figure 7:
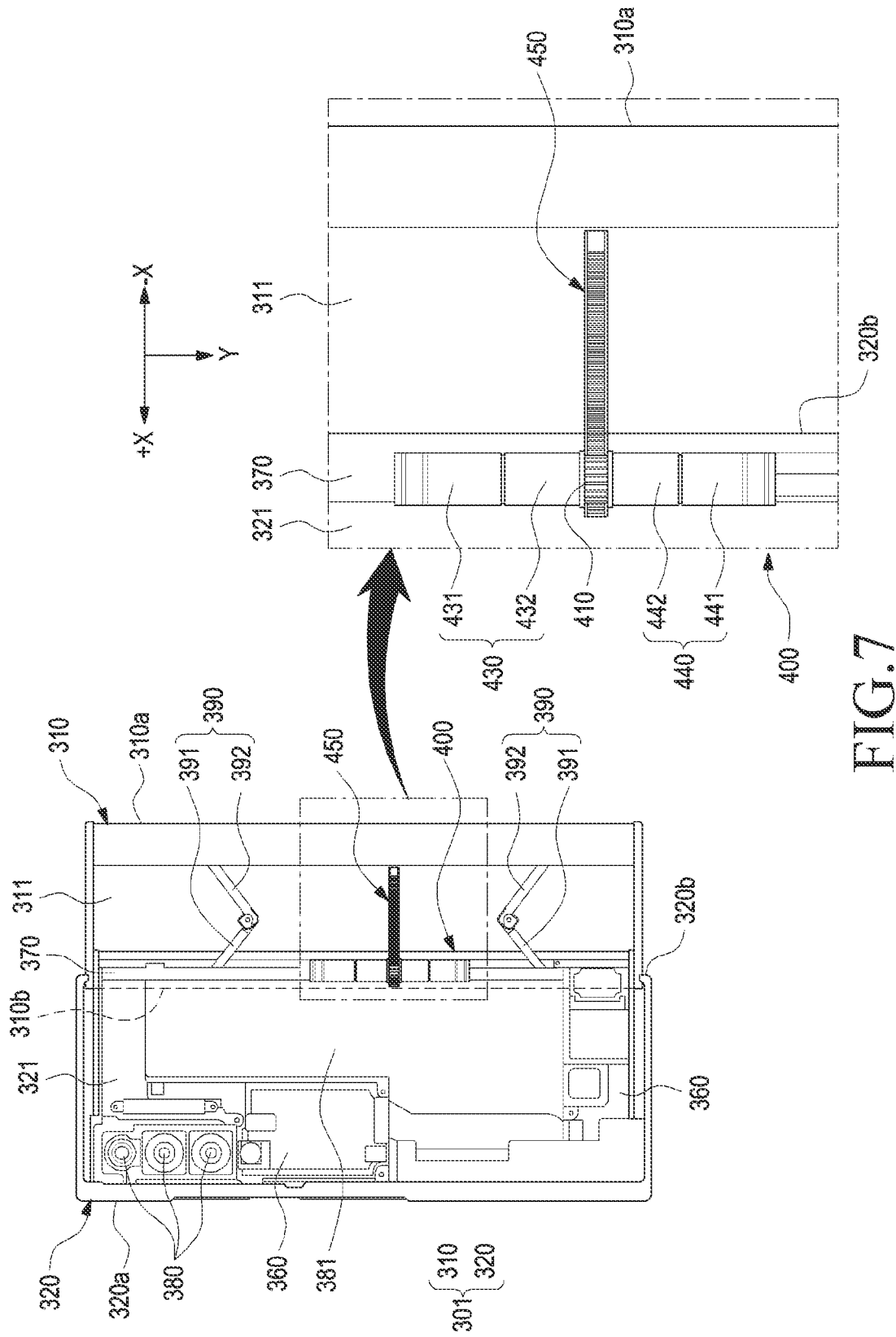
FIG. 7 is a diagram illustrating an electronic device in the state in which the first structure is slid out according to various embodiments.

FIG. 6 is a diagram illustrating an electronic device 300 in the state in which the first structure 310 is slid in according to various embodiments. FIG. 7 is a view illustrating the electronic device 300 in the state in which the first structure 310 is slid out according to various embodiments.

Referring to FIGS. 6 and 7, the electronic device 300 may further include a first structure 310, a second structure 320 (e.g., a main housing), a display (e.g., the display 350 in FIG. 5), and a driving unit 400. In addition, the electronic device 300 may further include a printed circuit board 360, a bracket 370, at least one electronic component 380, and a link member 390. For example, the electronic component 380 may include, for example, a battery 381. In addition, the electronic device 300 may or may not further include other components (e.g., a plate) of the electronic device 200 described above with reference to FIGS. 2, 3 and 4. Regarding the electronic device 300, redundant descriptions of the same components as those of the above-described electronic device 200 may not be repeated.

According to various embodiments of the disclosure, the electronic device 300 may include a first structure 310 and a second structure 320 coupled to surround at least a portion of the first structure 310 and guiding the sliding movement of the first structure 310. The first structure 310 and the second structure 320 may define the housing 301 of the electronic device 300, and one side surface of the first structure 310 and one side surface of the second structure 320 may define a first side surface 310a and a second side surface 320a of the housing 301, respectively. According to an embodiment, as illustrated in FIG. 7, the edges of the first structure 310 may include a first side surface 310a defining a portion of the exterior of the electronic device and a third side surface 310b located opposite to the first side surface 310a and surrounded in the internal space of the second structure 320. According to an embodiment, the edges of the second structure 320 may include a second side surface 320a defining a portion of the exterior of the electronic device and a fourth side surface 320b located opposite to the second side surface 320a and defining the exterior of the housing together with the first side surface 310a in the state in which the first structure 310 is accommodated in the second structure 320.

When the display (e.g., the display 350 in FIG. 5) is expanded, the first side surface 310a and the second side surface 320a of the housing 301 move away from each other, and when the display (e.g., the display 350 in FIG. 5) is contracted, the first side surface 310a and the second side surface 320a of the housing 301 may come closer to each other. FIG. 6 illustrates the slid-in state of the first structure 310, in which case the distance between the first side surface 310a and the second side surface 320a of the housing 301 may be the minimum. FIG. 7 illustrates the slid-out state of the first structure 310, in which case the distance between the first side surface 310a and the second side surface 320a of the housing 301 may be the maximum.

When the display (e.g., the display 350 is FIG. 5) is expanded or contracted, the distance between the first side surface 310a and the second side surface 320a of the housing 301 may be increased or decreased in the state of being supported by the link member 390 included inside the housing 301. For example, the link member 390 may include foldable components, and as a result, when the link member 390 is folded, the display of the electronic device 300 (e.g., the display 350 in FIG. 5) can be contracted, and when the link member 390 is unfolded, the display of the rollable electronic device 300 can be expanded. According to various embodiments, the link member 390 may be disposed between one side of a printed circuit board 360 and/or a bracket 370 disposed inside the second structure 320 and the first side surface 310a. For example, one end of the link member 390 may be connected to the bracket 370 disposed inside the second structure 320, and the other end may be connected to the inner surface of the first structure. The link member 390 may include a first arm 391 rotatably coupled to one side of the printed circuit board 360 and/or the bracket 370 and a second arm 392 rotatably coupled to the first arm 391 and also rotatably connected to the inner surface of the first structure. For example, in the state in which the link member 390 is folded, the first arm 391 and the second arm 392 may be oriented parallel to each other, and when the link structure 390 is unfolded, the first arm 391 and the second arm 392 may be inclined relative to each other to form a predetermined angle therebetween. A plurality of such link members 390 may be provided inside the housing 301, and when the distance between the first side surface 310a and the second side surface 320a of the housing 301 is variable, the link member 390 may serve to secure the endurance of the electronic device during the sliding movement by supporting at least a portion of the first structure 310.

According to various embodiments of the disclosure, the electronic device 300 may include a driving unit 400 configured to provide power for the sliding movement of the first structure 310. In addition, the electronic device 300 may include a rail unit 450 configured to receive power from the driving unit 400 and move along with the first structure 310 when the first structure 310 slides. Here, the rail unit 450 may have a shape that is perpendicular to the direction of the driving axis of the driving unit 400 and extends to be long in the width direction of the electronic device 300. The rail unit 450 may include a rack gear configured to mesh with a power transmission element (e.g., the pinion 410) of the driving unit 400. Accordingly, the driving unit 400 and the rail unit 450 may define a kind of rack and pinion structure. By the engagement between the driving unit 400 and the rail unit 450, the rotation motion of the driving unit 400 may be changed to a linear sliding motion of the first structure 310.

The driving unit 400 may include a pinion 410 configured to be engaged with the rail and a plurality of motor modules disposed on the same rotating shaft as the pinion 410. According to an embodiment, the plurality of motor modules may include a first motor module 430 and a second motor module 440. In addition, each of the first motor module 430 and the second motor module 440 may include a motor unit 431 or 441 and a reduction gear unit 432 or 442.

According to an embodiment, the plurality of motor modules may be disposed on one side and the other side of the pinion 410, respectively. With reference to the pinion 410, the first motor module 430 may be disposed on one side, and the second motor module 440 may be disposed on the other side. The motor units 431 and 441 and the reduction gear parts 432 and 442, which are respective components included in the first motor module 430 and the second motor module 440, may be disposed in series on one side and the other side of the pinion 410, respectively. For example, with reference to the pinion 410, the first reduction gear unit 432 and the first motor unit 431 may be sequentially disposed along the longitudinal direction of the electronic device 300 (the Y-axis direction), and with reference to the pinion 420, the second reduction gear unit 442 and the second motor unit 432 may be sequentially disposed.

When the display (e.g., the display 350 in FIG. 5) is expanded or contracted, the first structure 310 may receive power from the driving unit 400 to be slid in and accommodated in the inside of the second structure 320 or slid out and exposed to the outside of the second structure 320. As illustrated in FIGS. 6 and 7, in the slid-in and slid-out states of the first structure 310, the position of the driving unit 400 may be fixed, but the position of the rail unit 450 may be variable.

Figure 8A:
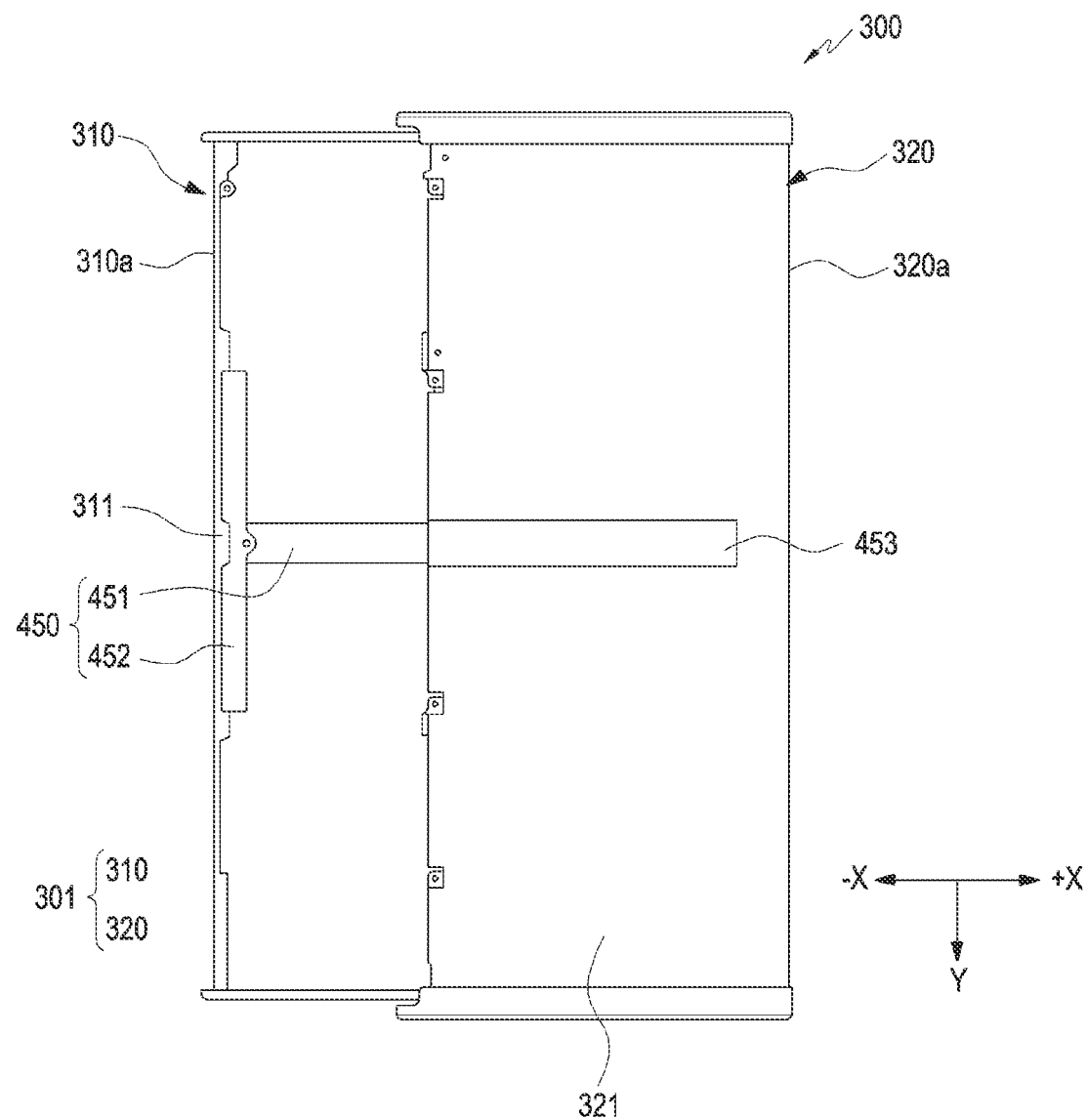
FIG. 8A is a diagram illustrating a rail unit in the state in which the first structure is slid out according to various embodiments.
Figure 8B:
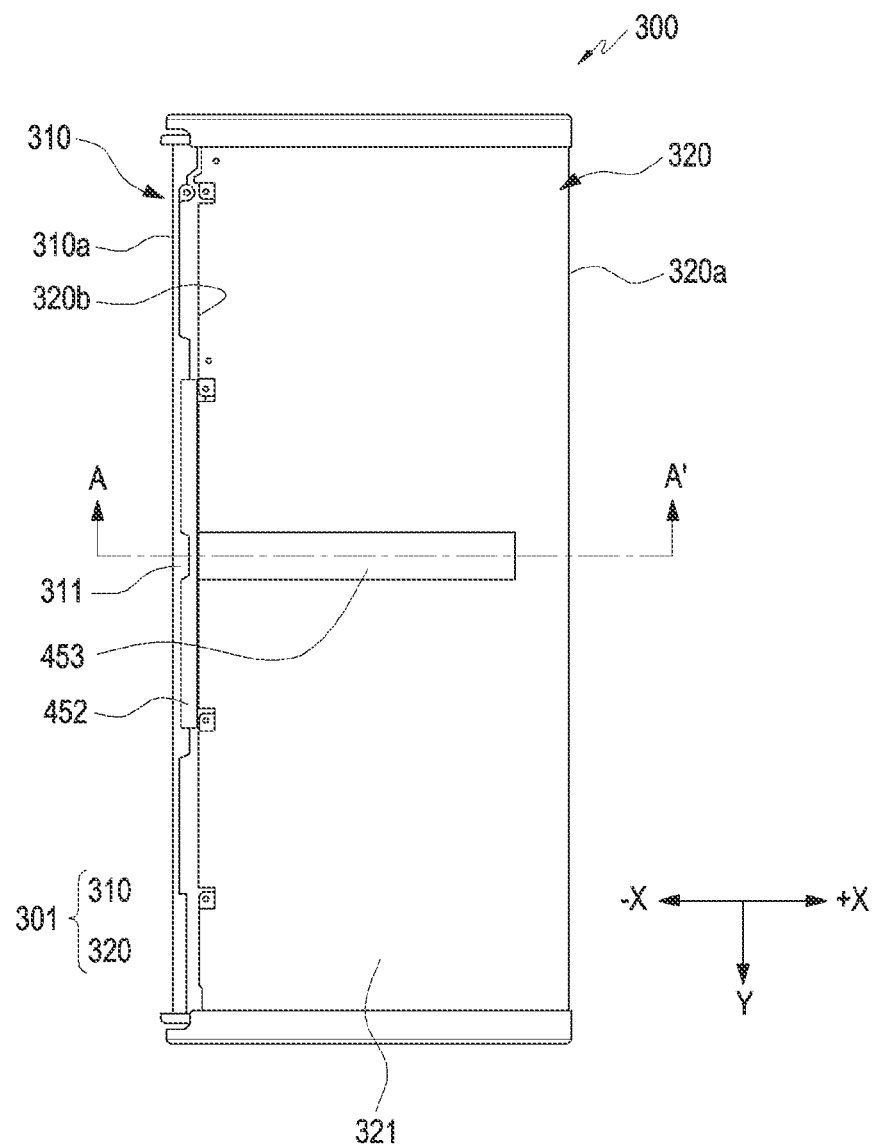
FIG. 8B is a diagram illustrating the rail unit in the state in which the first structure is slid in according to various embodiments.
Figure 8C:
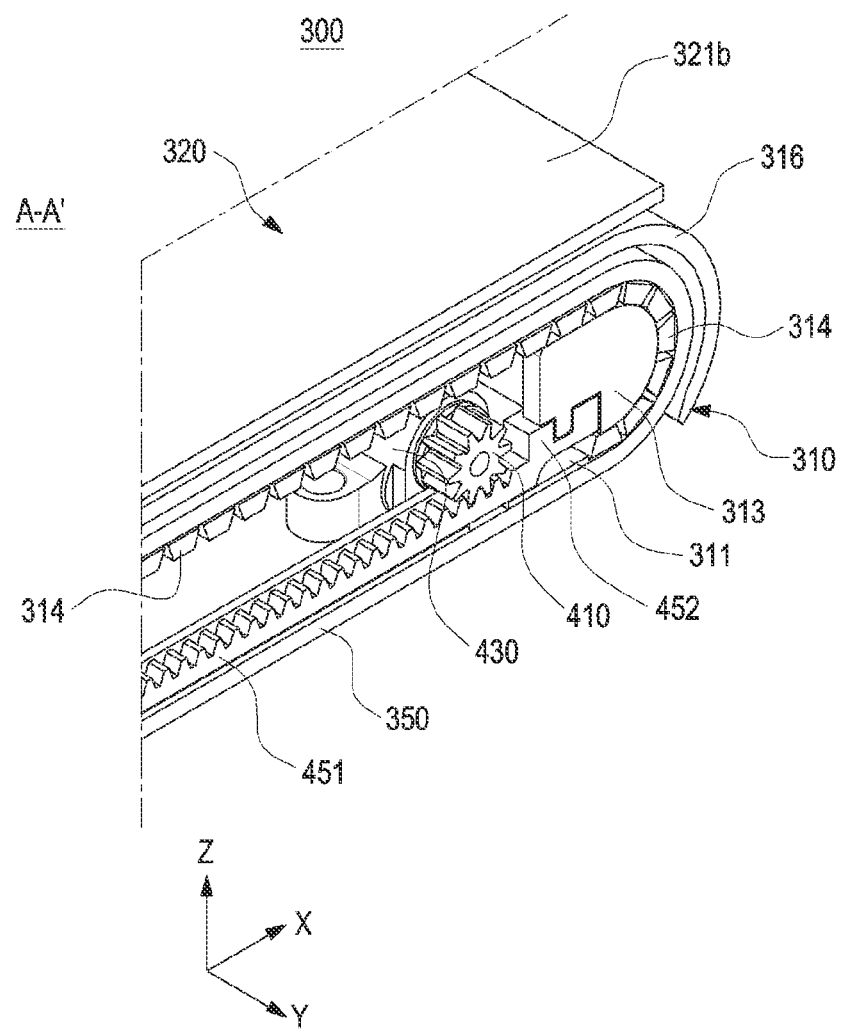
FIG. 8C is a perspective view illustrating a cross section of the electronic device in the state in which the first structure is slid in according to various embodiments.

FIG. 8A is a diagram illustrating the rail unit 450 in the state in which the first structure 310 is slid out, according to various embodiments. FIG. 8B is a view illustrating the rail unit 450 in the state in which the first structure 310 is slid in, according to various embodiments. FIG. 8C is a view illustrating a cross-section of the electronic device 300 in the state in which the first structure 310 is slid in, according to various embodiments. FIGS. 8A and 8B are views in which other components (e.g., electronic components) inside the housing 301 are omitted. FIG. 8C illustrates a cross-section of the electronic device 300 taken along line A-A' in FIG. 8B.

Referring to FIGS. 8A, 8B and 8C, the rail unit 450 may include a rail 451 and a frame 452. The rail 451 is configured to be engaged with the pinion 410 of the driving unit 400 illustrated in FIGS. 6 and 7, and may be configured as, for example, a rack gear. The rail 451 may extend to be long in the width direction of the electronic device 300 (e.g., the X-axis direction), and one side of the electronic device 300, the first plate 311 may be fixedly coupled to, for example, the frame 452 provided at an end of the first plate 311 of the first structure 310. According to an embodiment, the rail 451 may be configured as one-body with the frame 452.

Referring to FIGS. 8A and 8B, the rail 451 may move with the first structure 310 when the first structure 310 slides to be accommodated in the second structure 320 or to be exposed to the outside of the second structure 320. According to an embodiment, the second structure 320 may include a recess 453 configured to accommodate the rail 451 in the state in which the first structure 310 is at least partially accommodated in the second structure 320. The recess 453 may be provided adjacent to one side of the first structure 310, for example, the first side surface 310a and may have a shape for accommodating the rail 451 in the slide-in or slide-out operation of the first structure 310 relative to the second structure 320. For example, to correspond to the rail 451, the recess 453 may have a shape that extends to be long in the width direction of the electronic device (e.g., the x-axis direction) and may have a groove or opening structure having a length corresponding to the extending length of the rail 451.

FIG. 8C illustrate the electronic device 300 in the state in which the first structure 310 is slid in to the second structure 320. FIG. 8C illustrates a state in which at least a portion 316 of the first structure 310 (e.g., the fourth plate 316 in FIG. 5) is surrounded by the rear plate 321b of the second structure 320 (e.g., the third plate 221b in FIG. 4).

The electronic device 300 may further include an multi-articular hinge structure 314 and a bracket 313 supporting at least a portion of the multi-articular hinge structure 314. A portion of the display 350 is mounted or supported on the multi-articular hinge structure 314, and the bracket 313 may be configured to support a part of a plurality of bars or rods of the multi-articular hinge structure 314. The bracket 313 is a component that is fixedly disposed on one side of the first structure 310, and may be, for example, a roller housing in which a roller (e.g., the roller 235 in FIG. 4) is accommodated. In the disclosure, the rail 451 and/or the frame 452 may be coupled to the bracket 313. As illustrated in FIG. 8C, the rail 451 and/or the frame 452 may be coupled to one end of the bracket 213 to move together with the first structure 310 when the first structure 310 moves.

Figure 9:
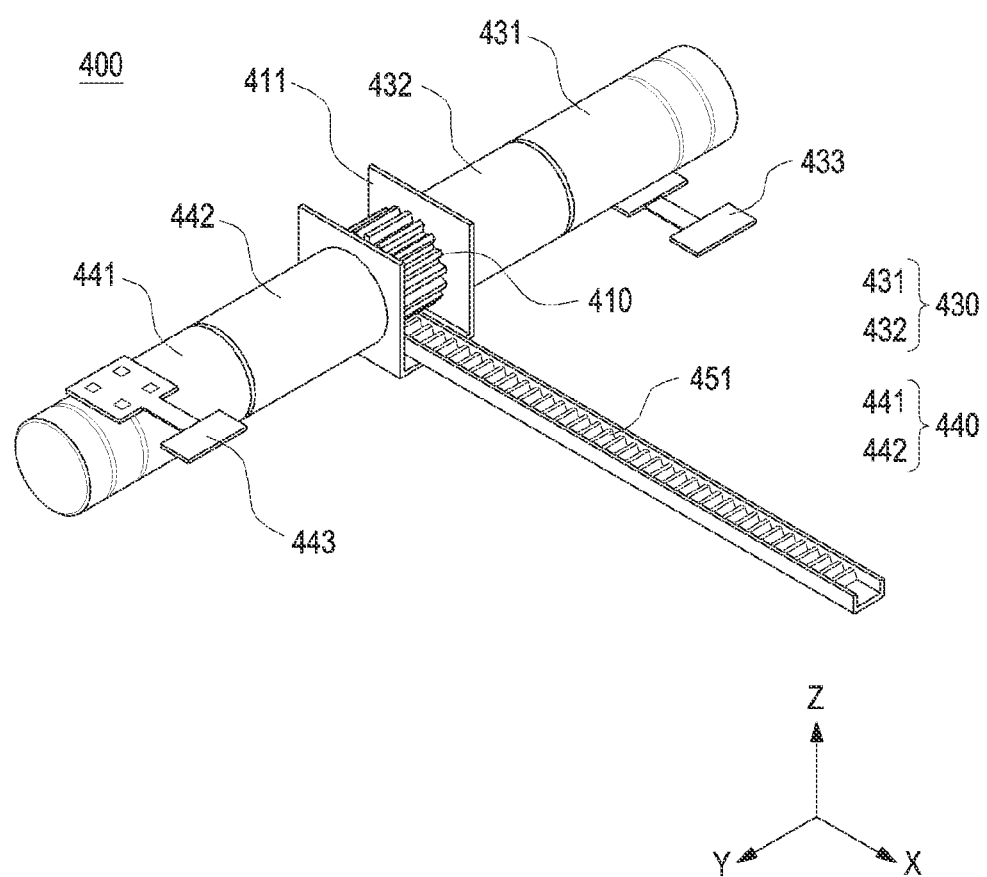
FIG. 9 is a perspective view illustrating a driving unit in a state of being engaged with a rail, according to various embodiments.

FIG. 9 is a perspective view illustrating a driving unit 400 in the state of being engaged with the rail 451 according to various embodiments.

According to various embodiments of the disclosure, an electronic device (e.g., the electronic device 300 in FIG. 5) may include a driving unit 400 including a plurality of motor modules. Hereinafter, as an example of the plurality of motor modules, a driving unit 400 including dual motors will be described. According to an embodiment, the driving unit 400 including the dual motors may be implemented by providing two substantially identical motor modules 430 and 440 to one side and the other side of the pinion 410, respectively.

The electronic device (e.g., the electronic device 300 in FIG. 5) may further include a pinion housing 411 at least partially surrounding the pinion 410. According to an embodiment, the first motor module 430 and the second motor module 440 may be coupled to the pinion 410 by being coupled to a shaft (not illustrated) that forms a rotation shaft of the pinion outside the pinion housing 411. According to an embodiment, the rail 451 may be configured to be engaged with the pinion inside the pinion housing 411.

FPCBs 433 and 443, each of which is configured to control driving of a motor, may be connected to the plurality of motor modules, respectively. For example, a first FPCB 433 may be connected to the first motor module 430, and a second FPCB 443 may be connected to the second motor module 440. The first motor module 430 and the second motor module 440 may be independently controlled by external control signals received via the first FPCB 433 and the second FPCB 443, respectively.

Figure 10A:
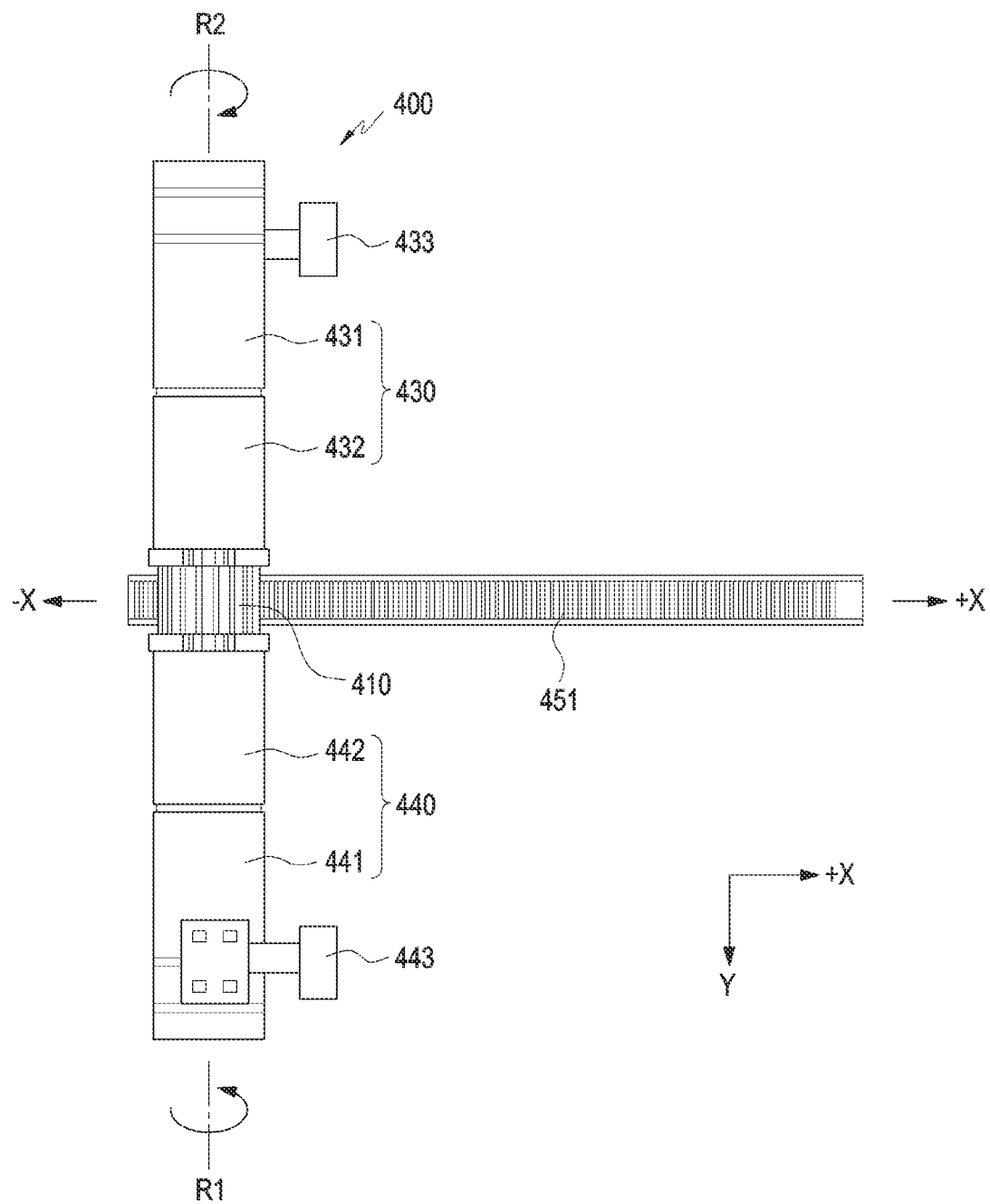
FIG. 10A is a diagram illustrating a state in which a first motor module and a second motor module are independently controlled by an external control signal received via the first FPCB and the second FPCB, according to various embodiments.
Figure 10B:
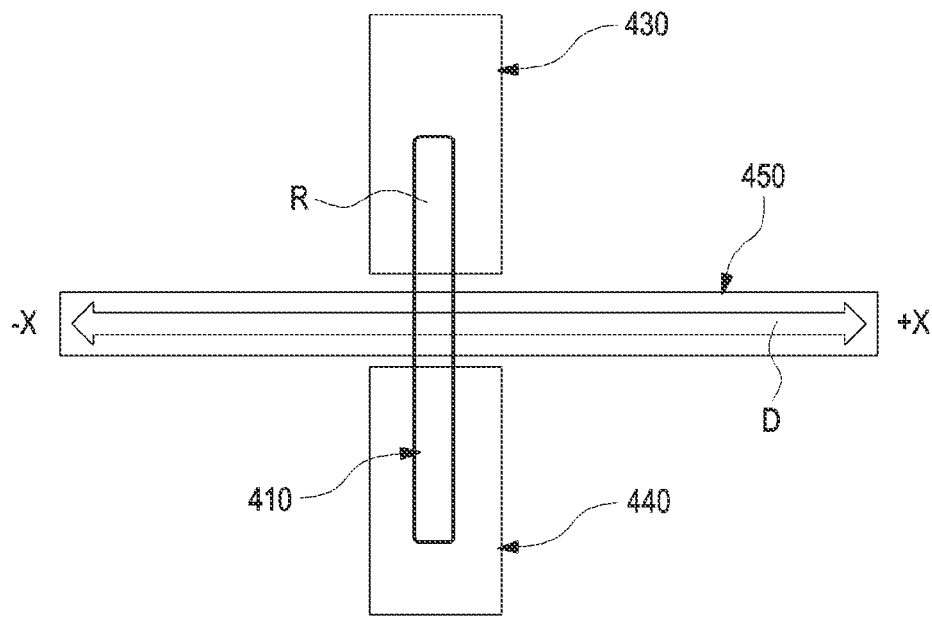
FIG. 10B is a diagram illustrating a state in which a rail unit moves due to a driving force of the first motor module and the second motor module, according to various embodiments.
Figure 10C:
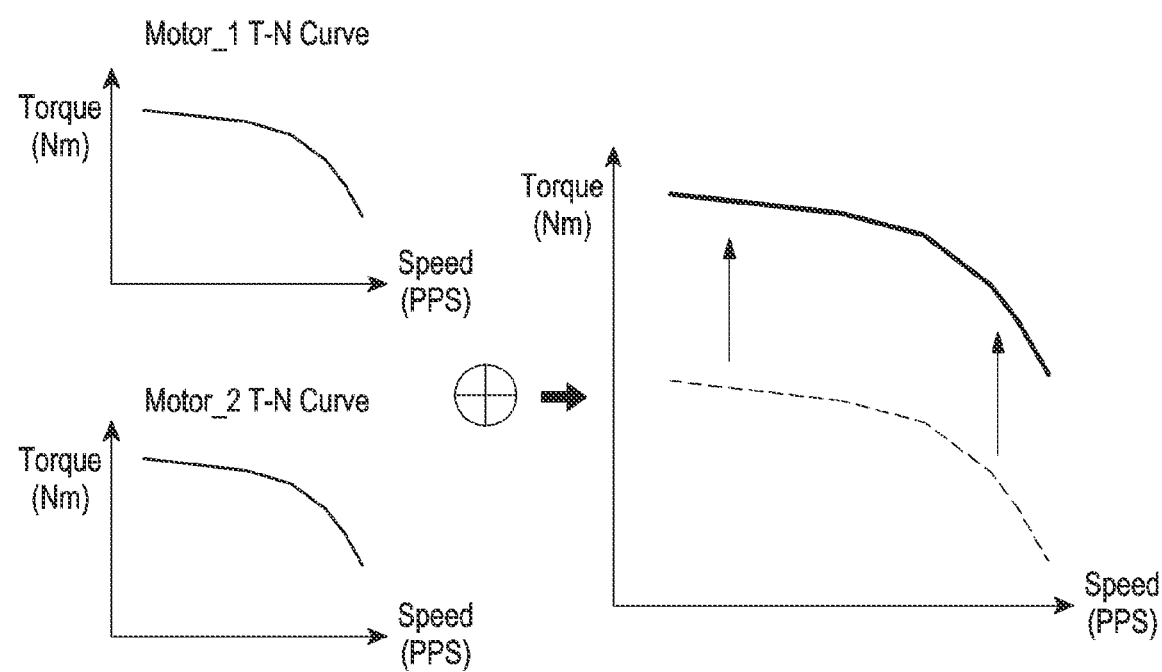
FIG. 10C illustrates graphs showing properties of a torque generated in each of the first motor module and the second motor module according to various embodiments.

FIG. 10A is a diagram illustrating the state in which the first motor module 430 and the second module 440 are independently controlled by external control signals received via the first FPCB 433 and the second FPCB 443, respectively, according to various embodiments. FIG. 10B is a diagram illustrating the state in which a rail unit 450 moves due to a driving force of the first motor module 430 and the second motor module 440, according to various embodiments of the disclosure. FIG. 10C includes graphs illustrating properties of a torque generated in each of the first motor module 430 and the second motor module 440.

When the first structure (e.g., the first structure 310 in FIG. 5) slides, the display (e.g., the display 350 in FIG. 5) may be expanded or contracted. A direction in which the display is contracted may correspond to the −X direction in FIG. 10A, and a direction in which the display is expanded may correspond to the +X in FIG. 10A. Of course, these embodiments are merely examples and do not limit the scope of the disclosure.

When the first motor unit 431 of the first motor module 430 rotates in a first direction R1 and the second motor unit 441 of the second motor module 440 rotates in a second direction R2, the rail 451 may linearly move in the +X direction while the pinion 410 rotates. When the first motor unit 431 rotates in the direction opposite to the first direction R1 and the second motor unit 441 of the second motor module 440 rotates in the second direction R2, or when the first motor unit 431 rotates in the first direction R1 and the second motor unit 441 of the second motor module 440 rotates in the direction opposite to the second direction R2, the rail 451 may linearly move in the −X direction.

Referring to FIG. 10B, the first motor module 430, which serves as a first power source, and the second motor module 440, which serves as a second power source, may be symmetrically arranged in the Y-axis direction, and may be disposed parallel to the rotation axis R formed by the pinion 410. Accordingly, the first motor module 430 and the second motor module 440 may be disposed to move on the same rotation axis. The first motor module 430, which serves as the first power source, and the second motor module 440, which serves as the second power source, may rotate in different directions (e.g., clockwise or counterclockwise) to cause the rail unit 450 to linearly move in the X-axis direction. As such, according to various embodiments of the disclosure, the rotation shaft of the motor and the driving shaft of the rail may be disposed to be orthogonal to each other.

Referring to FIG. 10C, the torque of the first motor 431 and the torque of the second motor 432 may be summed and implemented as a total torque acting on the rail.

In order to enable this driving, the configurations of the first motor unit 431 and the first reduction gear unit 432 included in the first motor module 430 may have the same specification as the configurations of the second motor unit 441 and the second reduction gear unit 442 included in the second motor module 440, and may be arranged symmetrical to each other about the pinion 410.

Figure 11:
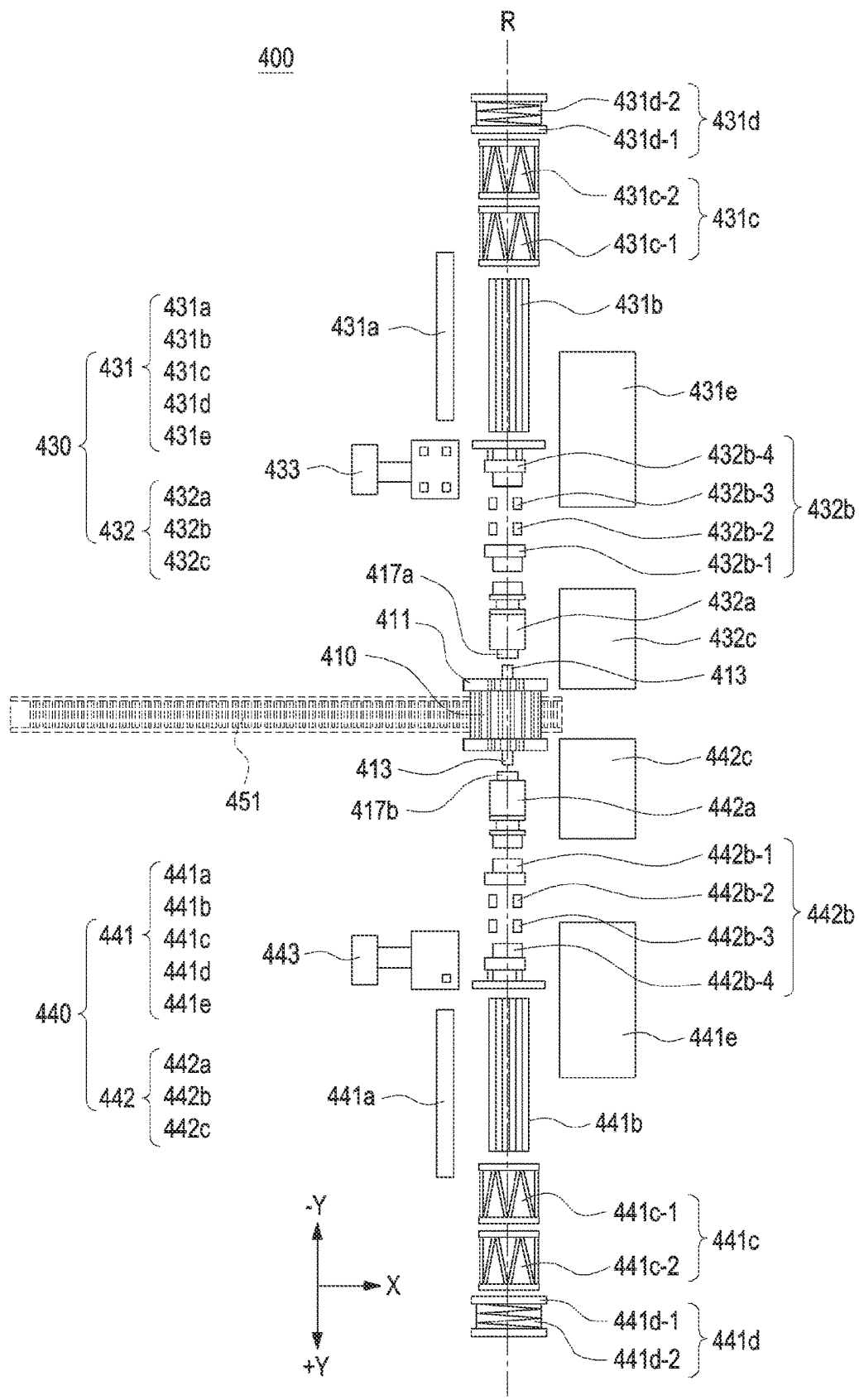
FIG. 11 is an exploded view illustrating a state in which the components of the driving unit are disassembled, according to various embodiments.
Figure 12:
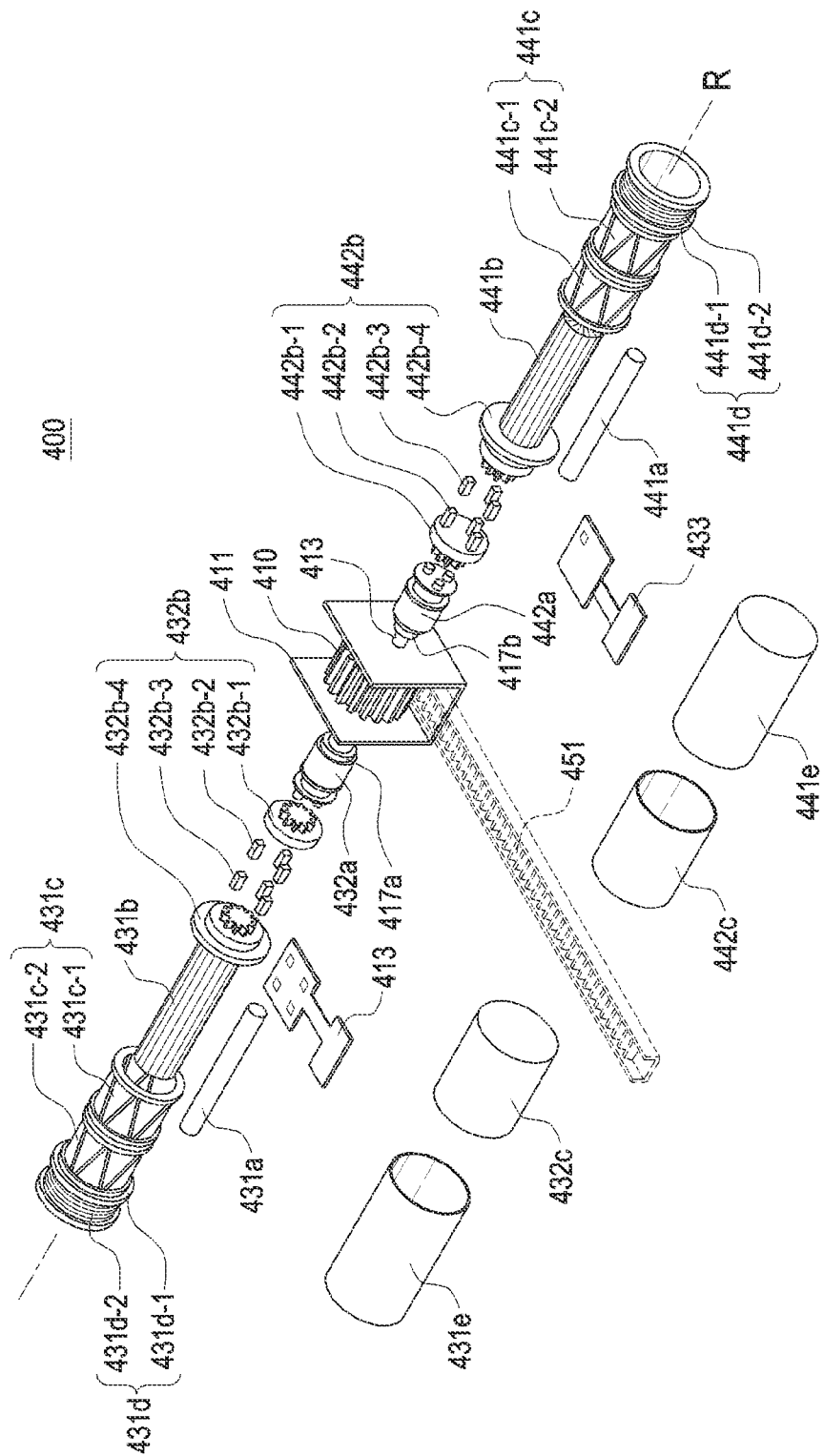
FIG. 12 is a perspective view of FIG. 11 according to various embodiments.
Figure 13:
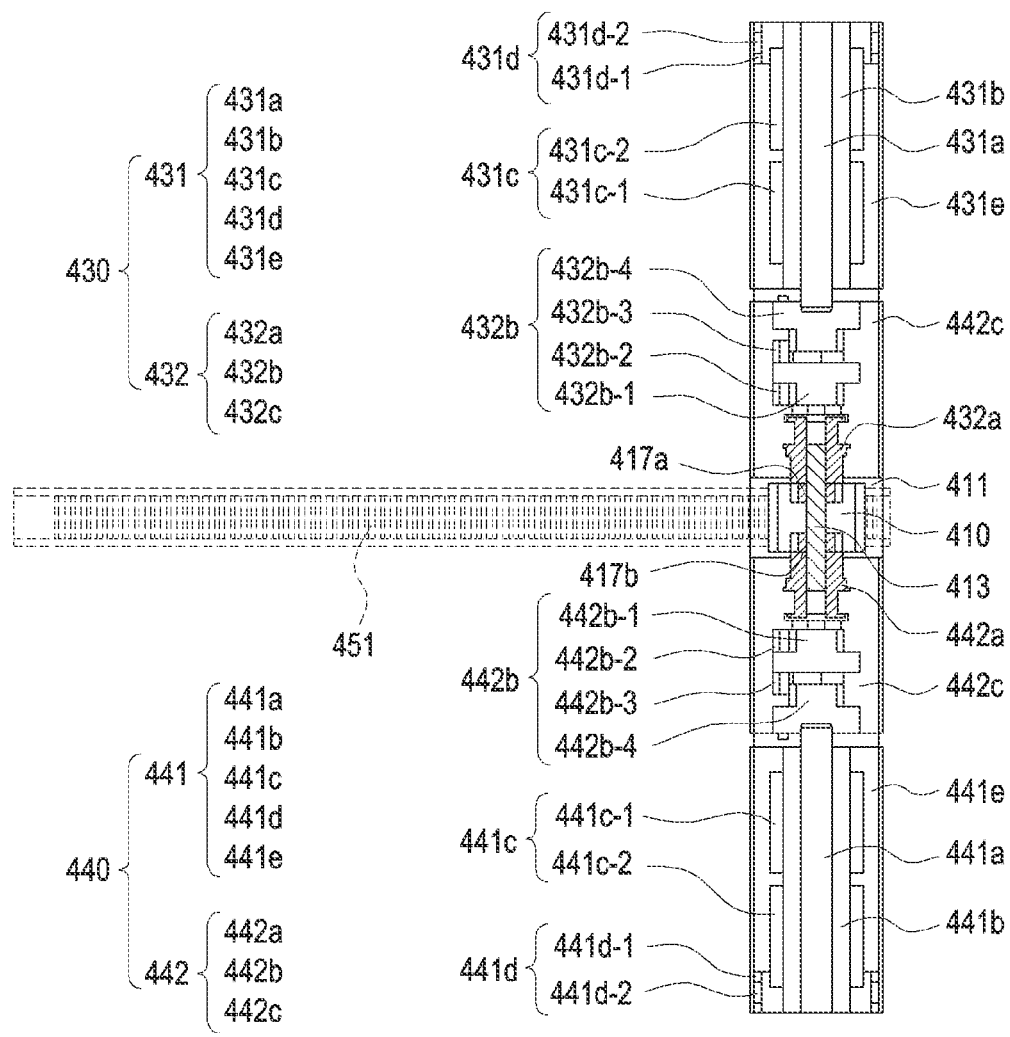
FIG. 13 is a cross-sectional view illustrating a state in which components of the driving unit are assembled, according to various embodiments.

FIG. 11 is an exploded view illustrating a state in which the components of the driving unit 400 are disassembled, according to various embodiments. FIG. 12 is an exploded perspective view corresponding to FIG. 11 according to various embodiments. FIG. 13 is a cross-sectional view illustrating a state in which the components of the driving unit 400 are assembled, according to various embodiments of the disclosure. Components of the driving unit 400 will be described in greater detail below with reference to FIGS. 11, 12 and 13.

Referring to FIGS. 11, 12 and 13, two motor modules 430 and 440 may be coupled to the pinion 410. The two motor modules 430 and 440 may be symmetrically disposed on one side and the other side of the pinion 410. For example, in the first motor module 430, a first motor unit 431 and a first reduction gear unit 432 may be arranged side by side in a first direction (e.g., the −Y-axis direction) with reference to the pinion 410, and in the second motor module 440, a second motor unit 441 and a second reduction gear unit 442 may be arranged side by side in a second direction (e.g., the +Y-axis direction) opposite to the first direction with reference to the pinion 410.

The first motor module 430 may include a first motor unit 431 configured to provide a driving force for rotating the pinion 410 in a first rotation direction and a first reduction gear unit 432 disposed between the first motor unit 431 and the pinion 410 to rotate the pinion 410 at an appropriate speed. The second motor module 440 may include a second motor unit 441 configured to provide a driving force for rotating the pinion 410 in a second rotation direction and a second reduction gear unit 442 disposed between the second motor unit 441 and the pinion 410 to rotate the pinion 410 at an appropriate speed.

The first motor unit 431 may configured as an assembly of a plurality of components accommodated inside the first motor unit housing 431e, for example, an assembly of a first motor shaft 431a, a first permanent magnet 431b, a first yoke 431c, and a first coil 431d. As an example of the assembly of the plurality of parts, the first motor shaft 431a may be coupled to the first permanent magnet 431b, and a plurality of yokes 431c-1 and 431c-2 may be arranged around the first permanent magnet 431b along the longitudinal direction of the first permanent magnet 431b. The first coil 431d may include a bobbin 431d-1 disposed to surround at least one first yoke 431c and a coil 431d-2 wound around the bobbin 431d-1. The first reduction gear unit 432 may be configured as an assembly of a plurality of components accommodated inside the first reduction gear unit housing 432c, for example, a first gear shaft 432a and a plurality of first reduction gears 432b. A first FPCB 433 configured to apply an electrical signal to the first coil 431d may be connected to one side of the first motor unit 431. In relation to a method of operating the first motor module 430, when an electrical signal is applied to the first coil 431d, a magnetic field may be formed around the first coil 431d and cause a change in a magnetic flux inside the first yoke 431c. An N pole or an S pole is switched on a claw of the first yoke 431c depending on the direction of the current flowing in the first coil 431d, which generates a force to rotate the first permanent magnet 431b. The first motor shaft 431a is coupled to the first permanent magnet 431b so that the first motor shaft 431a can be rotated according to the rotation of the first permanent magnet 431b. The first reduction gear unit 432 may serve to reduce the rotation speed of the first motor shaft 431a and to increase the torque generated by the first motor unit 431. According to various embodiments of the disclosure, depending on how many stages the torque and rotation speed of the first reduction unit 432 can be adjusted, the number and structure of the first reduction gears 432b may be variously determined in various ways. For example, in FIGS. 11 to 13, since the first reduction gear unit 432 configured to control the torque and speed in two stages is disclosed, the first reduction gears including four sets of gears 432b-1, 432b-2, 432b-3, and 432b-4 are illustrated, but are not limited thereto. The rotation speed of the first motor shaft 431a may be reduced via the plurality of first reduction gears 432b, and the increased rotational force of torque may be transmitted to the pinion 410 via the first gear shaft 432a. According to an embodiment, a first bushing may be disposed at one end of the first gear shaft 432a to be coupled to the shaft of the pinion 410, but the disclosure is also not necessarily limited thereto.

The second motor unit 432 may be configured as an assembly of a plurality of components accommodated inside the second motor unit housing 441e, for example, an assembly of a second motor shaft 441a, a second permanent magnet 441b, a second yoke. 441c, and a second coil 441d. As an example of the assembly of the plurality of parts, the second motor shaft 441a may be coupled to the second permanent magnet 441b, and a plurality of yokes 441c-1 and 441c-2 may be arranged around the second permanent magnet 441b along the longitudinal direction of the second permanent magnet 441b. The second coil 441d may include a bobbin 441d-1 disposed to surround at least one second yoke 441c and a coil 441d-2 wound around the bobbin 441d-1. The second reduction gear unit 442 may be configured as an assembly of a plurality of components accommodated inside the second reduction gear unit housing 442c, for example, a second gear shaft 442a and a plurality of second reduction gears 442b. A second FPCB 443 configured to apply an electrical signal to the second coil 441d may be connected to one side of the second motor unit 441. The above-described method of operating the first motor module 430 may be equally applied to the method of operating the second motor module 440. In addition, in FIGS. 11 to 13, since the second reduction gear unit 442 configured to control the torque and speed in two stages is disclosed, the second reduction gears including four sets of gears 442b-1, 442b-2, 442b-3, and 442b-4 are illustrated, but the disclosure is not limited thereto. According to an embodiment, a second bushing may be disposed at one end of the second gear shaft 442a to be coupled to the shaft of the pinion 410, but the disclosure is also not necessarily limited thereto.

It should be noted that the above-described embodiment of FIGS. 11 to 13 is an embodiment of detailed components of the driving unit 400 including, for example, a dual motor, and does not limit the scope of the disclosure. According to the above-described embodiments, configurations relating to dual motors including stepping yokes are disclosed, but not necessarily limited thereto. For example, the driving unit 400 according to various embodiments of the disclosure may include other various types of motors, such as BLDC and linear actuator types of motors. In addition, the reduction gear included in the electronic device is illustrated as having two stages, but is not limited thereto, and may include a reduction gear configured to be reduced to three stages or to four or more stages.

Figure 14:
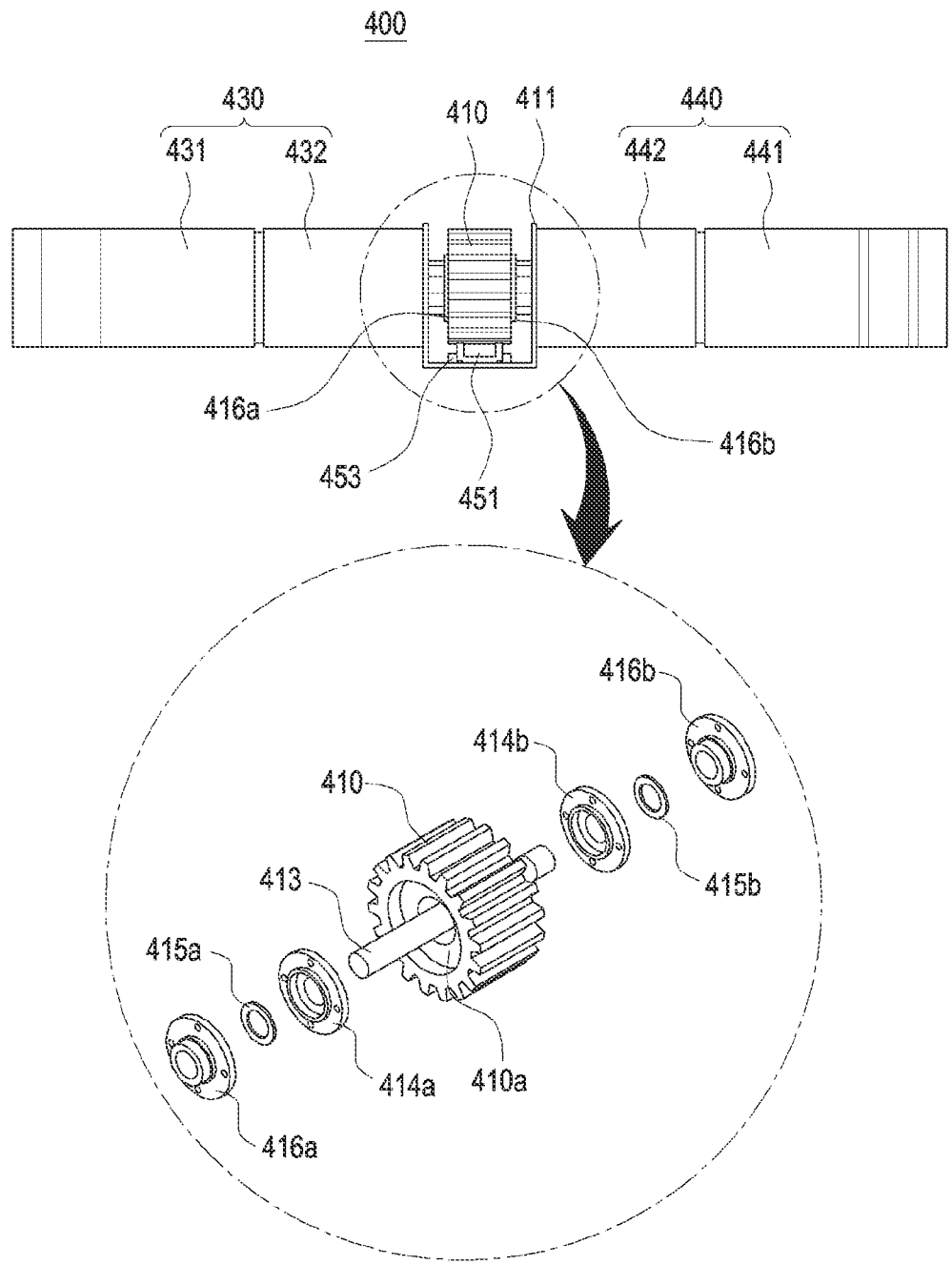
FIG. 14 is a diagram illustrating a pinion and components around the same, according to various embodiments.

FIG. 14 is a diagram illustrating a pinion 410 and components around the same, according to various embodiments.

According to various embodiments, the pinion shaft 413 may be assembled with the pinion 410, and the ends of the first reduction gear part 432 and the second reduction gear part 442, which are provided on one side and the other side of the pinion 410, may be assembled with the pinion 410 via the pinion shaft 413. At this time, since the high torques generated by the motor units 431 and 441 are simultaneously transmitted to one pinion shaft 413, a structure for increasing the rigidity of the pinion 410 may be required.

Referring to FIG. 14, a structure in which a first base cover 414a and a first side cover 416a are coupled to each other may be disposed on one side of the pinion shaft 413, and an elastic member 415a may be disposed inside the first base cover 414a and the first side cover 415a. The assembly of the first base cover 414a, the first side cover 416a, and the first elastic member 415a may be coupled to a seating portion 410a provided on one side of the pinion 410, and may push one end of the pinion shaft 413 toward the pinion 410. A structure in which a second base cover 414b and a second side cover 416b are coupled to each other may be disposed on the other side of the pinion shaft 413, and a second elastic member 415b may be disposed inside the second base cover 414b and the second side cover 416b. The assembly of the second base cover 414b, the second side cover 416b, and the second elastic member 415b may be coupled to a seating portion (not illustrated) provided on the other side of the pinion 410, and may push the other end of the pinion shaft 413 toward the pinion 410.

Figure 15:
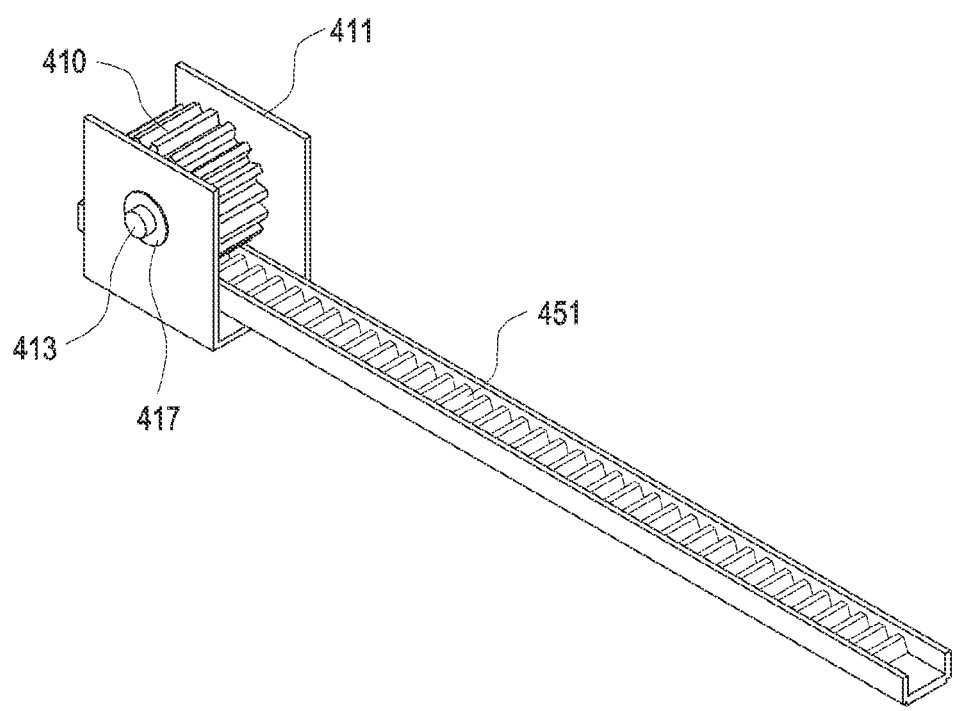
FIG. 15 is a perspective view illustrating a pinion and a pinion housing according to various embodiments.

FIG. 15 is a perspective view illustrating a pinion 410 and a pinion housing 411 according to various embodiments.

The pinion shaft 413 may be coupled to a hole provided in the pinion housing 411 through a bushing 417 (e.g., the first bushing 417a and the second bushing 417b in FIG. 11). According to an embodiment, the surface of the bushing 417 may include a graphite component having a low coefficient of friction, and thus, it is possible to minimize and/or reduce wear due to friction when the pinion shaft 413 rotates. In addition, by providing the bushing 417 having high rigidity, it is possible to prevent and/or reduce twisting of the pinion shaft 413. According to various embodiments, a ball bearing may be used in placement of the bushing 417.

FIG. 16 is a diagram illustrating a pinion 410 and a gear shaft according to various embodiments.

The embodiment illustrated in FIG. 16 may provide a pinion 410 different from the pinion 410 described above with reference to FIGS. 14 and 15.

For example, the pinion 410 according to the embodiment illustrated in FIGS. 14 and 15 includes a base cover, a washer, a side cover, and a bushing in the pinion housing 411. However, in the pinion 410 according to the embodiment illustrated in FIG. 16, instead of the base cover, the washer, the side cover, and the bushing, gear shafts 432a and 442a are directly connected to the pinion 410.

Referring to FIG. 16, with the pinion 410, it is possible to further increase the rigidity of the connection structure and the coupling precision of components since the first gear shaft 432a and the second gear shaft 442a of the first reduction gear unit 432 and the second reduction gear unit 442 are directly coupled to the seating portion (e.g., the seating portion 410a in FIG. 14). According to an embodiment, a spline S.P. may be provided on the seating portion (e.g., the seating portion 410a in FIG. 14) of the pinion 410, and key structures provided at the ends of the first gear shaft 432a and the second gear shaft 442a may be fitted thereto.

Figure 17:
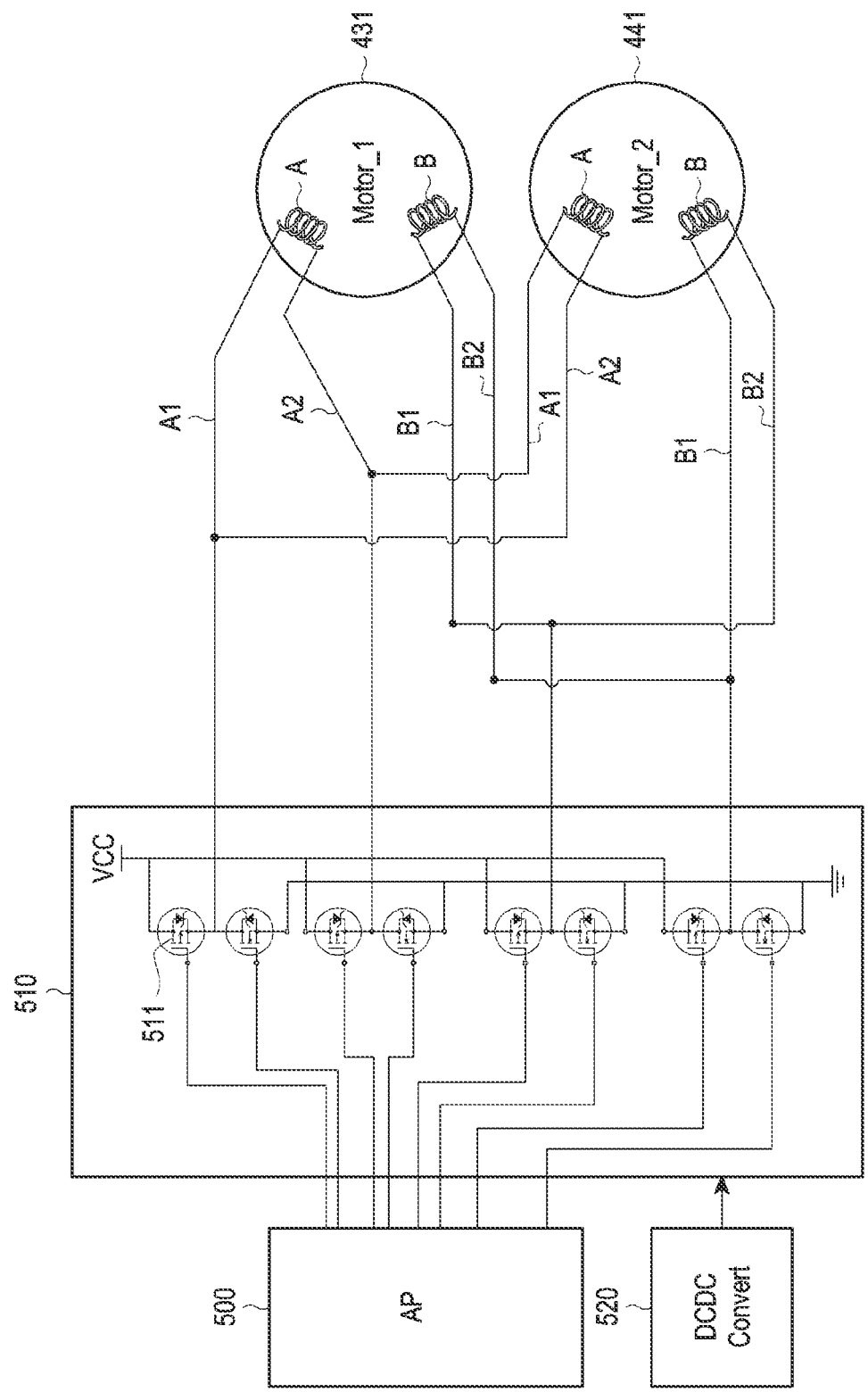
FIG. 17 is a circuit diagram illustrating a driving unit including a dual motor according to various embodiments.

FIG. 17 is a diagram illustrating example signal flow for controlling a driving unit (e.g., the driving unit 400 in FIG. 6) including a dual motor according to various embodiments.

According to various embodiments of the disclosure, the electronic device may include a processor 500 and at least one control circuit 510 for controlling the dual motors in addition to the processor. For example, the control circuit 510 may be a motor drive IC. When respective motors module included in the dual motors are used, a drive deviation may occur due to, for example, gear dephosporization between respective motor modules or wear of gears. Therefore, a correction for synchronization of the motor modules may be required.

According to various embodiments of the disclosure, the dual motors may be designed to be symmetrical with reference to the rotation axis thereof and may have a wiring structure for equally transmitting electrical signals corresponding thereto. For example, the control circuit 510 configured to control the dual motors may include wires having the same length from the control circuit 510 to respective motor modules.

The processor 500 may transmit a PWM signal for motor control to the control circuit 510. In this case, a DC/DC converter 520 may provide a power source for a rated output of the motors. In addition, the control circuit 510 may apply a current to the coils A and B included in respective motor modules to rotate the motor. In this case, the application of the current may be implemented via a plurality of switching transistors 511 included in the control circuit 510. Accordingly, the coils A and B of respective motor modules are magnetized so that the rotors of the motors can be rotated. According to various embodiments, in the disclosure, equal voltage and current are applied to each of the motor modules included in the dual motor. However, in this case, since the motor modules have to rotate in different directions, an inversely symmetric wiring structure may be applied in order to rotate the motor module in different directions.

Referring to FIG. 17, according to an embodiment, an electronic device may include a first motor unit 431 including a $(1-1)^{th}$ coil A and a $(1-2)^{th}$ coil B and a second motor unit 441 including a $(2-1)^{th}$ coil A and a $(2-2)^{th}$ coil B. Here, when signals are applied to the signal line A1 and the signal line A2 connected to the $(1-1)^{th}$ coil A, the polarity of the yoke wrapped by the first coil A may have an N pole or an S pole. In the disclosure, since the signal line A1 and the signal line A2 connected to the $(2-1)^{th}$ coil A branch such that signals opposite to those applied to the signal lines connected to the $(1-1)^{th}$ coil are applied thereto, respective yokes included in the first motor unit 431 and the second motor unit 441 can be magnetized to have different polarities. Since opposite signals are also applied to a $(1-2)^{th}$ coil B and a $(2-2)^{th}$ coil B, respective yokes included in the first motor unit 431 and the second motor unit 441 corresponding to the coils can be magnetized to have different polarities. In this way, it may be possible to control the driving unit including the dual motors that require rotation in different directions.

Figure 18A:
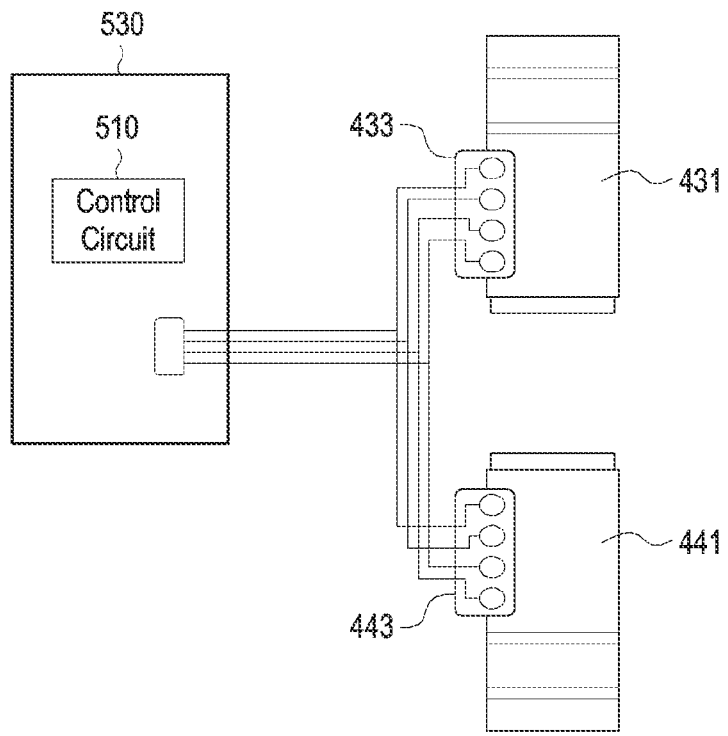
FIG. 18A is a diagram illustrating wiring from a control circuit to a first motor unit and a second motor unit, according to various embodiments.
Figure 18B:
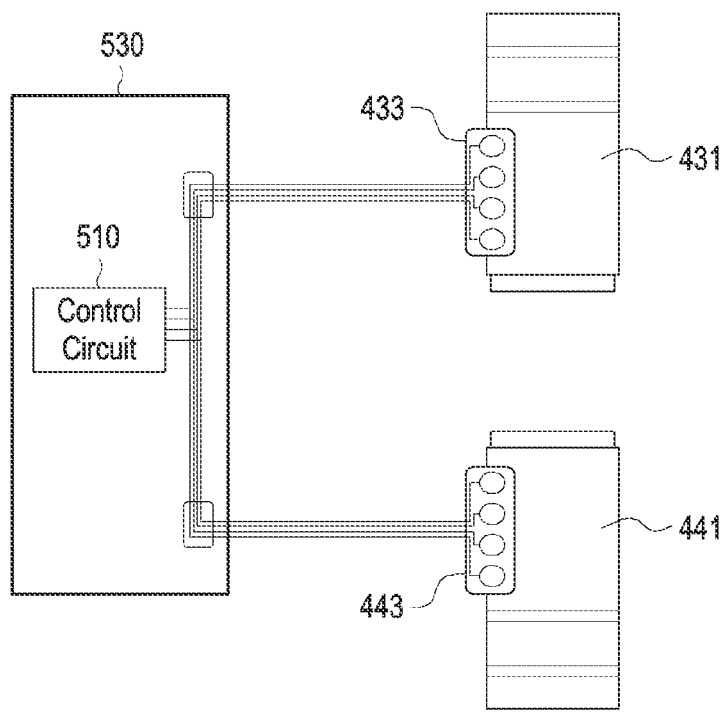
FIG. 18B is a diagram illustrating wiring from a control circuit to a first motor unit and a second motor unit, according to various embodiments.

FIG. 18A is a diagram illustrating wiring from the control circuit 510 to the first motor unit 431 and the second motor unit 441, according to various embodiments. FIG. 18B is a diagram illustrating wiring from the control circuit 510 to the first motor unit 431 and the second motor unit 441, according to various embodiments.

Referring to FIGS. 18A and 18B, according to an example embodiment, the control circuit 510 may be mounted on a board 530. The first motor unit 431 and the second motor unit 432 receive electrical signals of opposite phases, respectively, and rotate in different directions. However, it may be necessary to apply electrical signals of equal voltage and current to the first and second motor units to generate power of the same magnitude. As illustrated in FIG. 18A, the control circuit 510 may be connected to the first motor unit 431 and the second motor unit 432 using a connector in the state in which wires connected to the first motor unit 431 and the second motor unit 432 are at least partially embedded in the board 530. Alternatively, as illustrated in FIG. 18B, the wires of the control circuit 510 may be directly connected to the first motor unit 431 and the second motor unit 432. In both the embodiments of FIGS. 18A and 18B, the wires for electrical connection from the control circuit 510 to the first motor unit 431 and the second motor unit 441 may have substantially the same length.

Figure 19:
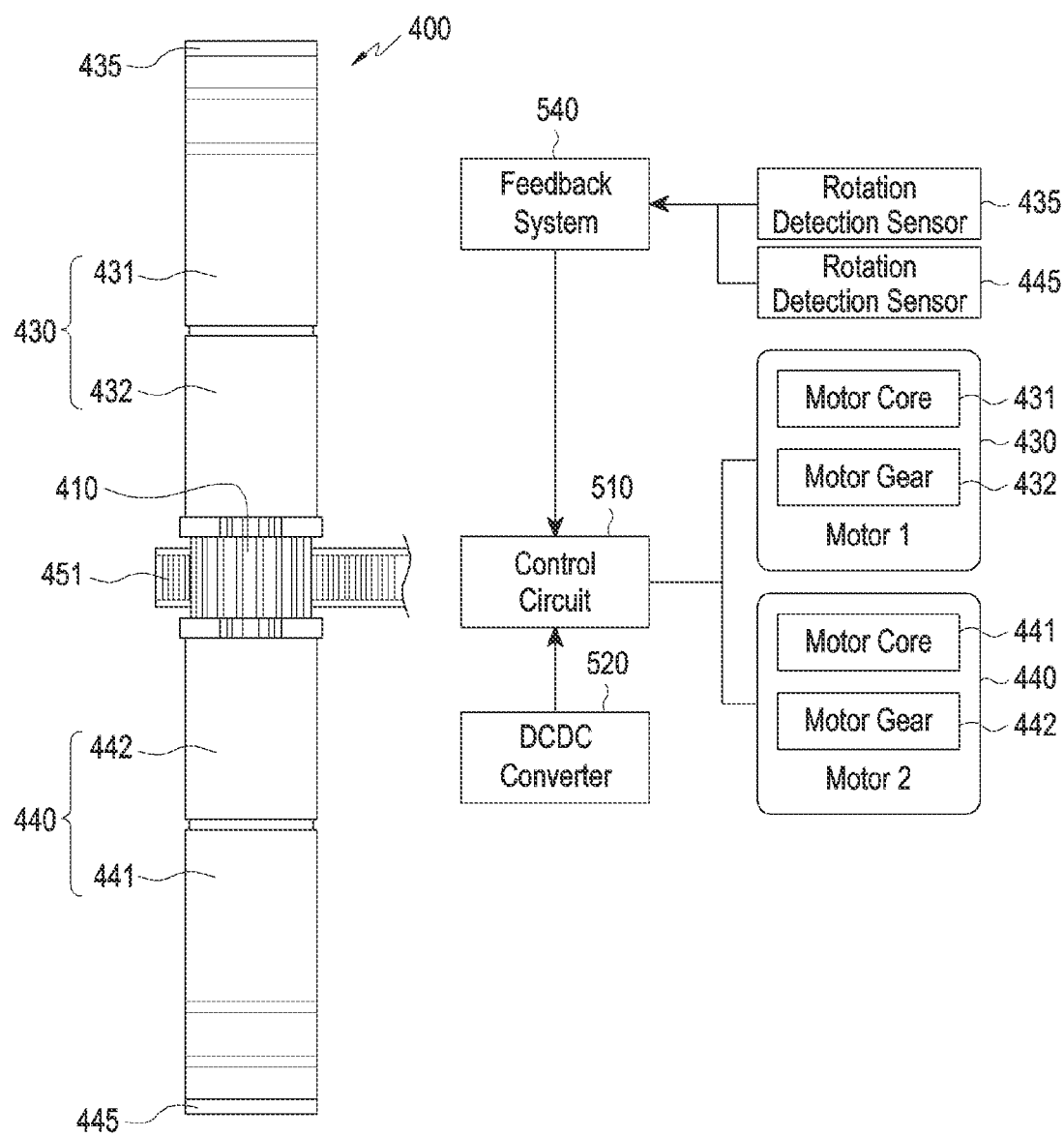
FIG. 19 is a block diagram illustrating an example configuration of a driving unit and a system for controlling and compensating the same, according to various embodiments.

FIG. 19 is a block diagram illustrating an example driving unit 400 and a system for controlling and compensating the same, according to various embodiments.

According to an embodiment of the disclosure, the electronic device may control the first motor module 430 including the first motor unit 431 and the first gear reduction unit 432 and the second motor module 440 including the second motor unit 441 and the second gear reduction unit 442 via the control circuit 510, for example, a motor drive IC. In addition, the electronic device may further include a feedback system 540 to compensate for damage caused by a physical external force and/or chemical damage to the motor unit.

As illustrated in FIG. 19, the electronic device may further include, at respective ends of the first motor module 430 and the second motor module 440, a first sensor 435 and a second sensor 445 each configured to measure the number of rotations of a motor. According to an embodiment, information on the performance change of the motor measured via the first sensor 435 and the second sensor 445 is transmitted to the feedback system 540, the feedback system 540 may cause the motors to operate at the number of rotations corresponding to a preset number of rotations via the control circuit 510 based on this information.

Figure 20:
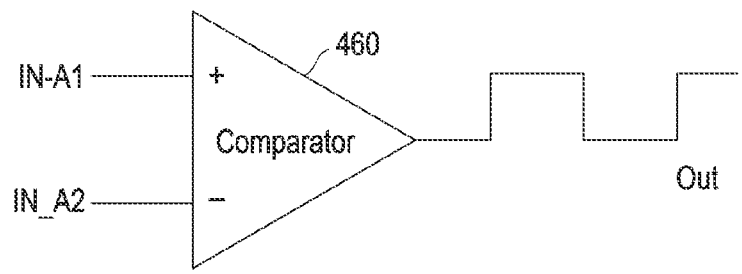
FIG. 20 is a diagram illustrating an apparatus for detecting the number of rotations of a driving unit, according to various embodiments.

FIG. 20 is a diagram illustrating an apparatus for detecting the number of rotations of a driving unit 400, according to various embodiments.

Referring to FIG. 20, the electronic device may further include a comparator 460 as a device for detecting the number of rotations of the driving unit 400. The comparator 460 may be disposed at the front end of the coil (e.g., the coil A) described above with reference to FIG. 17, and electrical signals input through two signal lines input to the coil may be compared using the comparator. The currents and/or voltages input to the motors may be compared using the comparator 460, and when a problem such as output degradation occurs in a specific motor, it may be identified. According to various embodiments, a plurality of comparators 460 may be provided to compare phase currents or voltages of a plurality of motor modules.

Figure 21:
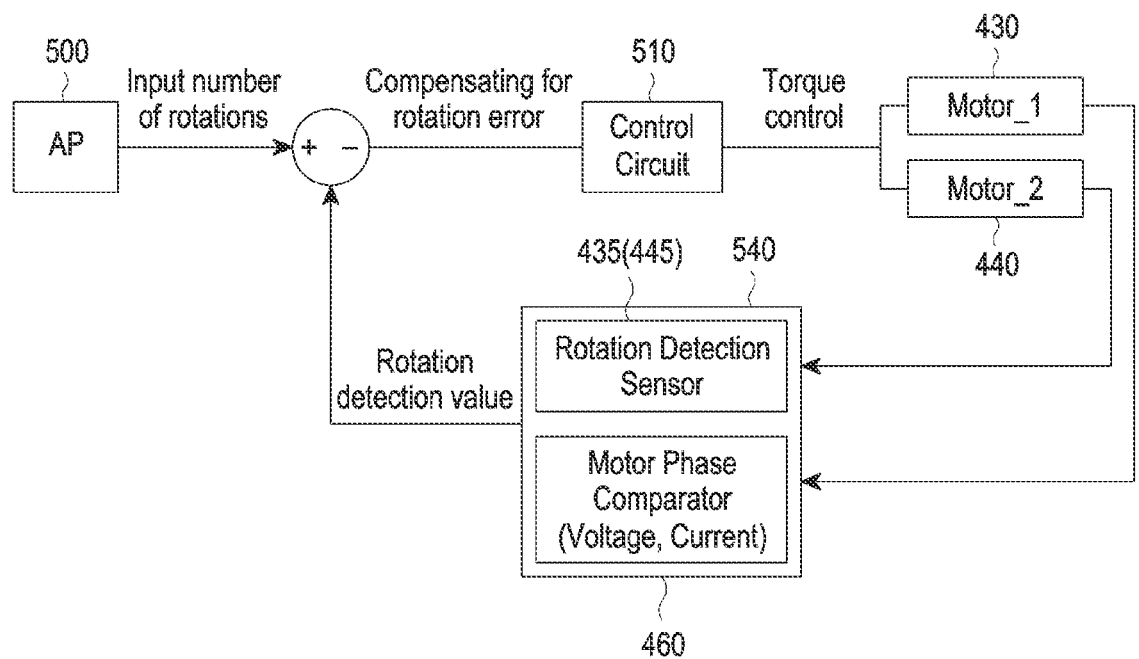
FIG. 21 is a block diagram illustrating an example closed-loop system configured to compensate for the number of rotations of a driving unit, according to various embodiments.

FIG. 21 is a diagram illustrating a closed-loop system configured to compensate for the number of rotations of a driving unit 400, according to various embodiments.

According to an embodiment, it is possible to identify whether a motor is abnormal by detecting the number of rotations output from the motor.

For example, the control circuit 510 controls the torques of the first motor module 430 and the second motor module 440, and it is possible to detect whether or not the first motor unit of the first motor module 430 and the second motor unit of the second motor module 440 using the feedback system 540 are abnormal. The feedback system 540 may detect the numbers of rotations via rotation speed detection sensors 435 and 445 (e.g., the first sensor 435 and the second sensor 445 in FIG. 19) or may detect the actual numbers of motors by detecting the currents and/or voltages of the motors via a motor phase comparator 460 (e.g., the comparator 460 in FIG. 20). The detected actual numbers of rotations are compared with predetermined numbers of rotations at the time of normal operation of the motors, wherein predetermined numbers of rotations are input to the processor 500, and compensation for a rotation error value at this time may be reflected when driving the first module 430 and the second motor module 440 via the control circuit 510.

Figure 22:
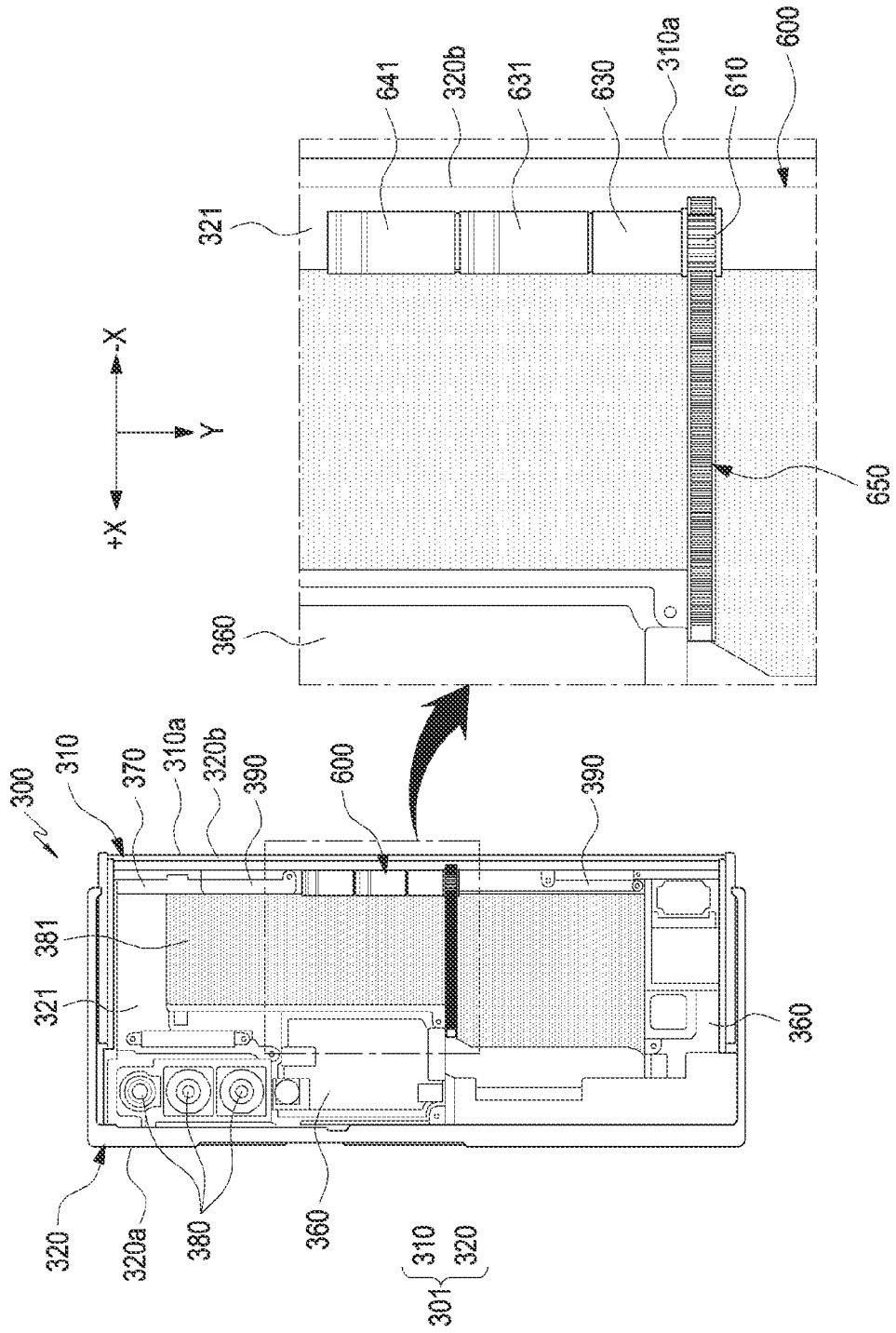
FIG. 22 is a diagram illustrating an electronic device in the state in which the first structure is slid in according to various embodiments.
Figure 23:
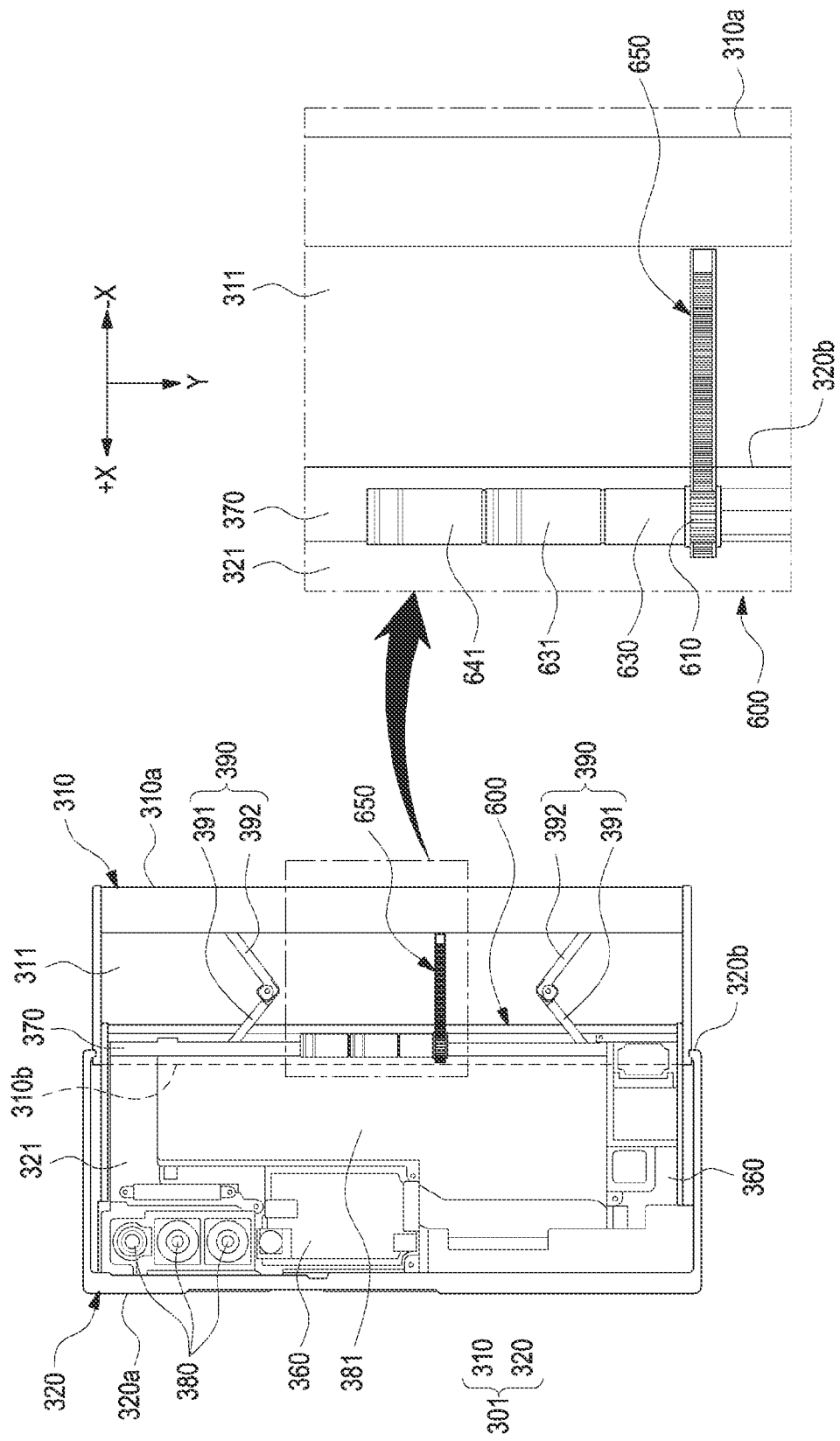
FIG. 23 is a diagram illustrating an electronic device in the state in which the first structure is slid out according to various embodiments.
Figure 24:
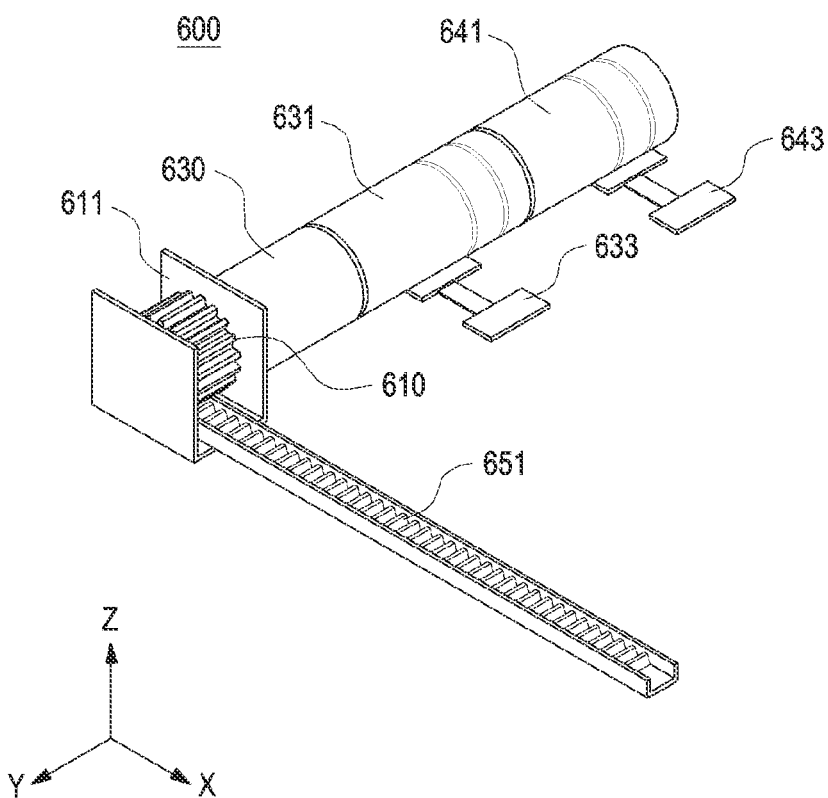
FIG. 24 is a perspective view illustrating a driving unit in a state of being engaged with a rail, according to various embodiments.

FIG. 22 is a diagram illustrating an electronic device 300 in the state in which the first structure 310 is slid in according to various embodiments. FIG. 23 is a view illustrating the electronic device 300 in the state in which the first structure 310 is slid out according to various embodiments. FIG. 24 is a perspective view illustrating a driving unit 600 in the state of being engaged with the rail 651 according to various embodiments.

The components of the electronic device 300 of FIG. 22 and FIG. 23 may be the same as or similar to at least one of the components of the electronic device 300 of FIG. 6 and FIG. 7, and redundant description will be omitted below.

Hereinafter, as an example of the plurality of motor modules, a driving unit 600 including dual motors in series will be described.

According to various embodiments of the disclosure, the electronic device 300 may include a driving unit 600 configured to provide power for the sliding movement of the first structure 310. In addition, the electronic device 300 may include a rail unit 650 configured to receive power from the driving unit 600 and move along with the first structure 310 when the first structure 310 slides. Here, the rail unit 650 may have a shape that is perpendicular to the direction of the driving axis of the driving unit 600 and extends to be long in the width direction of the electronic device 300. The rail unit 650 may include a rack gear configured to mesh with a power transmission element (e.g., the pinion 610) of the driving unit 600. Accordingly, the driving unit 600 and the rail unit 650 may define a kind of rack and pinion structure. By the engagement between the driving unit 600 and the rail unit 650, the rotation motion of the driving unit 600 may be changed to a linear sliding motion of the first structure 310.

The electronic device 300 may further include a pinion housing 611 at least partially surrounding the pinion 610. According to an embodiment, the first motor module and the second motor module may be coupled to the pinion 610 by being coupled to a shaft (not illustrated) that forms a rotation shaft of the pinion outside the pinion housing 611. According to an embodiment, the rail 651 may be configured to be engaged with the pinion inside the pinion housing 611.

FPCBs 633 and 643, each of which is configured to control driving of a motor, may be connected to the plurality of motor modules, respectively. For example, a first FPCB 633 may be connected to the first motor unit 631, and a second FPCB 643 may be connected to the second motor module 641. The first motor module and the second motor module may be independently controlled by external control signals received via the first FPCB 633 and the second FPCB 643, respectively.

The driving unit 600 may include a pinion 610 configured to be engaged with the rail and a plurality of motor modules disposed on the same rotating shaft as the pinion 610. According to an embodiment, the plurality of motor modules may include a first motor module and a second motor module. In addition, each of the first motor module and the second motor module may include a motor unit 631 or 641. The driving unit 600 may include a reduction gear unit 630. According to an embodiment, the reduction gear unit 630 may be formed to decelerate both the first motor unit 631 and the second motor unit 641.

According to an embodiment, the plurality of motor modules may be disposed on one side of the pinion 610. With reference to the pinion 610, the first motor unit 631 and the second motor unit 641 may be disposed in series on one side. For example, with reference to the pinion 610, the first reduction gear unit 630, the first motor unit 631 and the second motor unit 641 may be sequentially disposed along the longitudinal direction of the electronic device 300 (the Y-axis direction).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments of the disclosure, it is possible to provide an electronic device including a flexible display, wherein the electronic device includes: a first housing (e.g., the first structure 210 in FIG. 1, or the first structure 310 in FIG. 5) capable of being slid; a second housing (e.g., the second structure 220 in FIG. 1, or the second structure 320 in FIG. 5); a flexible display (e.g., the flexible display 350 in FIG. 5) including a first region mounted on one surface of the first housing and a second region extending from the first region, wherein the second region is at least partially accommodated inside the first housing or the second housing or exposed to an outside of the first housing or the second housing according to a sliding movement of the first housing; a driving unit (e.g., the driving unit 400 in FIG. 6) disposed in the second housing and configured to provide power for sliding the first housing; and a rail unit including a rail (e.g., the rail unit 450 in FIG. 6) configured to receive the power from the driving unit and to move together with the first housing when the first housing slides, wherein the driving unit includes a pinion (e.g., the pinion 410 in FIG. 6) disposed to be engaged with the rail of the rail unit and a plurality of motor modules (e.g., the motor modules 430 and 440 in FIG. 6) disposed on a same rotation shaft as the pinion.

According to various example embodiments, the plurality of motor modules may include: a first motor module (e.g., the first motor module 430 in FIG. 6) including a first motor unit comprising a motor (e.g., the first motor unit 431 in FIG. 6) and a first reduction gear (e.g., the first reduction gear unit 432 in FIG. 6) disposed between the first motor unit and the pinion, wherein the first motor unit and the first reduction gear are disposed in series on one side of the pinion; and a second motor module (e.g., the second motor module 440 in FIG. 6) including a second motor unit comprising a motor (e.g., the second motor unit 441 in FIG. 6) and a second reduction gear (e.g., the second reduction gear unit 442 in FIG. 6) disposed between the second motor unit and the pinion, wherein the second motor unit and the second reduction gear unit are disposed in series on the other side of the pinion.

According to various example embodiments, the plurality of motor modules may be symmetrically disposed with reference to the pinion.

According to various example embodiments, the driving unit may be fixedly disposed at one side edge of the second housing.

According to various example embodiments, the rail may be fixedly disposed on the first housing.

According to various example embodiments, the first housing may include a first front plate oriented in a first direction and a first rear plate (e.g., the fourth plate 316 in FIG. 5) oriented in a second direction opposite the first direction, and the second housing may include a second front plate oriented in the first direction and a second rear plate (e.g., the second rear plate 221*a* in FIG. 4) oriented in the second direction opposite the first direction.

According to various example embodiments, the pinion may be fixedly coupled to one side edge of the second housing.

According to various example embodiments, the rail may be fixedly disposed on the first front plate (e.g., the first plate 211 of FIG. 4) defining the first surface of the first housing.

According to various example embodiments, the electronic device may further include a guide member including a guide rail disposed at one side edge of the first housing, wherein the guide member is configured to guide the flexible display such that the flexible display moves in a clockwise or counterclockwise direction while maintaining a predetermined curvature.

According to various example embodiments, the electronic device may further include an multi-articular hinge structure comprising a hinge configured to support the flexible display.

According to various example embodiments, the electronic device may further include a processor and a control circuit configured to control the plurality of motor modules.

According to various example embodiments, wires configured to electrically connect the control circuit to the plurality of motor modules have a substantially equal length.

According to various example embodiments, the electronic device may further include sensors configured to detect numbers of rotations of the plurality of motor modules, respectively.

According to various example embodiments, the electronic device may further include a plurality of comparators (e.g., the comparators in FIG. 20) configured to compare phase currents or voltages of the plurality of motor modules.

According to various example embodiments, the electronic device may further include a feedback system including various circuitry (e.g., the feedback system 540 in FIG. 19) configured to estimate numbers of rotations of the plurality of motor modules by comparing the numbers of rotations of the plurality of motor modules or the phase currents or voltages of the plurality of motor modules, and to compensate for an abnormality of a motor based on the estimated actual numbers of rotations.

According to various example embodiments of the disclosure, it is possible to provide an electronic device including a flexible display, wherein the electronic device includes: a first housing including a first front plate oriented in a first direction and a first rear plate oriented in a second direction opposite the first direction; a second housing including a second front plate oriented in the first direction and a second rear plate oriented in the second direction opposite the first direction, wherein the second housing is coupled to surround at least a portion of the first housing and configured to guide a sliding movement of the first housing; a flexible display including a first region mounted on one surface of the first housing and a second region extending from the first region, wherein the second region is at least partially accommodated inside the first housing or exposed to the outside of the first housing according to sliding movement of the first housing; a guide member including a guide rail disposed at one side edge of the first housing, wherein the guide member is configured to guide the flexible display such that the flexible display moves in a clockwise or counterclockwise direction while maintaining a predetermined curvature; a driving unit including circuitry fixedly coupled to one side edge of the second housing and disposed at least partially parallel to the guide member, wherein the driving unit is configured to provide power for sliding the first housing; and a rail unit comprising a rail configured to receive the power from the driving unit and to move together with the first housing when the first housing slides, wherein the driving unit includes a pinion disposed to be engaged with a rail of the rail unit and a plurality of motor modules including at least one motor disposed on a same rotation shaft as the pinion.

According to various example embodiments, the plurality of motor modules may include: a first motor module including a first motor and a first reduction gear disposed between the first motor and the pinion, wherein the first motor and the first reduction gear are disposed in series on one side of the pinion; and a second motor module including a second motor and a second reduction gear disposed between the second motor and the pinion, wherein the second motor and the second reduction gear are disposed in series on another side of the pinion.

According to various example embodiments, the plurality of motor modules may be symmetrically disposed with reference to the pinion.

According to various example embodiments, the electronic device may further include a processor and a control circuit configured to control the plurality of motor modules.

According to various example embodiments, the electronic device may further include a feedback system (e.g., the feedback system 540 in FIG. 19) including circuitry configured to estimate numbers of rotations of the plurality of motor modules by comparing the numbers of rotations of the plurality of motor modules or the phase currents or voltages of the plurality of motor modules, and to compensate for an abnormality of a motor based on the estimated actual numbers of rotations.

While the disclosure has been illustrated and described with reference to various example embodiments, it will be understood that the various example embodiments are intended to be illustrative, not limiting. It will be further understood by those skilled in the art that various modification may be made without departing from the true spirit and full scope of the disclosure, including the appended claims and their equivalents.

What is claimed is:

1. An electronic device including a flexible display, the electronic device comprising:
    a first housing capable being slid;
    a second housing;
    a flexible display including a first region mounted on one surface of the first housing and a second region extending from the first region, wherein the second region is at least partially accommodated inside the first housing or the second housing or exposed to an outside of the first housing or the second housing based on a sliding movement of the first housing;
    a driving unit disposed in the second housing and configured to provide power for sliding the first housing; and
    a rail unit including a rail configured to receive the power from the driving unit and to move together with the first housing when the first housing slides,
    wherein the driving unit includes a pinion disposed to be engaged with the rail of the rail unit and a plurality of motor modules, each including a motor, disposed on a same rotation shaft as the pinion.

2. The electronic device of claim 1, wherein the plurality of motor modules include:
    a first motor module including a first motor and a first reduction gear disposed between the first motor and the pinion, wherein the first motor and the first reduction gear are disposed in series on one side of the pinion; and
    a second motor module including a second motor and a second reduction gear disposed between the second motor and the pinion, wherein the second motor and the second reduction gear are disposed in series on another side of the pinion.

3. The electronic device of claim 1, wherein the plurality of motor modules are symmetrically disposed with reference to the pinion.

4. The electronic device of claim 1, wherein the driving unit is fixedly disposed at one side edge of the second housing.

5. The electronic device of claim 1, wherein the rail is fixedly disposed on the first housing.

6. The electronic device of claim 1, wherein the first housing includes a first front plate oriented in a first direction and a first rear plate oriented in a second direction opposite the first direction, and
    the second housing includes a second front plate oriented in the first direction and a second rear plate oriented in the second direction opposite the first direction.

7. The electronic device of claim 6, wherein the pinion is fixedly coupled to one side edge of the second housing.

8. The electronic device of claim 6, wherein the rail is fixedly disposed on the first front plate which defines the first surface of the first housing.

9. The electronic device of claim 6, further comprising:
    a guide disposed at one side edge of the first housing, wherein the guide is configured to guide the flexible display such that the flexible display moves in a clockwise or counterclockwise direction while maintaining a predetermined curvature.

10. The electronic device of claim 1, further comprising:
    an multi-articular hinge configured to support the flexible display.

11. The electronic device of claim 1, further comprising:
    a processor; and
    a control circuit configured to control the plurality of motor modules.

12. The electronic device of claim 11, wherein wires configured to electrically connect the control circuit to the plurality of motor modules have a substantially equal length.

13. The electronic device of claim 11, further comprising:
    sensors configured to detect numbers of rotations of the plurality of motor modules, respectively.

14. The electronic device of claim 11, further comprising:
    a plurality of comparators configured to compare phase currents or voltages of the plurality of motor modules.

15. The electronic device of claim 11, further comprising:
    a feedback system comprising circuitry configured to estimate numbers of rotations of the plurality of motor modules by comparing the numbers of rotations of the plurality of motor modules or the phase currents or voltages of the plurality of motor modules, and to compensate for an abnormality of a motor based on the estimated actual numbers of rotations.

16. An electronic device including a flexible display, wherein the electronic device includes:
    a first housing including a first front plate oriented in a first direction and a first rear plate oriented in a second direction opposite the first direction;
    a second housing including a second front plate oriented in the first direction and a second rear plate oriented in the second direction opposite the first direction, wherein the second housing is coupled to surround at least a portion of the first housing and configured to guide a sliding movement of the first structure;
    a flexible display including a first region mounted on one surface of the first structure and a second region extending from the first region, wherein the second region is at least partially accommodated inside the first housing or exposed to the outside of the first housing according to sliding movement of the first housing;
    a guide member including a guide rail disposed at one side edge of the first housing, wherein the guide member is configured to guide the flexible display such that the flexible display moves in a clockwise or counterclockwise direction while maintaining a predetermined curvature;
    a driving unit including circuitry fixedly coupled to one side edge of the second housing and disposed at least partially parallel to the guide member, wherein the driving unit is configured to provide power for sliding the first housing; and
    a rail unit comprising a rail configured to receive the power from the driving unit and to move together with the first housing when the first housing slides, wherein the driving unit includes a pinion disposed to be engaged with a rail of the rail unit and a plurality of motor modules including at least one motor disposed on a same rotation shaft as the pinion.

17. The electronic device of claim 16, wherein the plurality of motor modules include: a first motor module including a first motor and a first reduction gear disposed between the first motor and the pinion, wherein the first motor and the first reduction gear are disposed in series on one side of the pinion; and a second motor module including a second motor and a second reduction gear disposed between the second motor and the pinion, wherein the second motor and the second reduction gear are disposed in series on another side of the pinion.

18. The electronic device of claim 16, wherein the plurality of motor modules are symmetrically disposed with reference to the pinion.

19. The electronic device of claim 16, further comprising: a processor and a control circuit configured to control the plurality of motor modules.

20. The electronic device of claim 16, further comprising: a feedback system including circuitry configured to estimate numbers of rotations of the plurality of motor modules by comparing the numbers of rotations of the plurality of motor modules or the phase currents or voltages of the plurality of motor modules, and to compensate for an abnormality of a motor based on the estimated actual numbers of rotations.

* * * * *